United States Patent
Nagatani et al.

(10) Patent No.: US 6,496,474 B1
(45) Date of Patent: Dec. 17, 2002

(54) SPREAD ENCODING DEVICE AND METHOD

(75) Inventors: Kazuo Nagatani, Kanagawa (JP); Yasuyuki Oishi, Kanagawa (JP); Hajime Hamada, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,377

(22) Filed: Sep. 23, 1998

(30) Foreign Application Priority Data

Mar. 19, 1998 (JP) .......................................... 10-069171

(51) Int. Cl.$^7$ ............................................... H04J 13/02
(52) U.S. Cl. ........................ 370/208; 370/342; 375/140
(58) Field of Search ................................ 370/208, 335, 370/342, 441; 375/140

(56) References Cited

U.S. PATENT DOCUMENTS 5,193,094 A * 3/1993 Viterbi ......................... 714/795
5,423,001 A * 6/1995 Ueda ............................ 329/372

OTHER PUBLICATIONS

R.F. Ormondroyd, et al. "Performance of Low–Rate Orthogonal Convolutional Codes in DS–CDMA Applications" IEEE Transactions on Vehicular Technology, vol. 46, No. 2; May, 1997; p. 320–328.

A.J Viterbi, et al. "Very Low Rate Convolutional Codes for Maximum Theoretical Performance of Spread–Spectrum Multiple–Access Channels" IEEE Journal on Selected Areas in Communications, vol. 8, No. 4 May, 1990; pp. 641–649.

* cited by examiner

Primary Examiner—Melvin Marcelo
(74) Attorney, Agent, or Firm—Katten, Muchin, Zavis, Rosenman

(57) ABSTRACT

An m-bit shift register stores data to be sent that are generated by a data generator 1 bit at a time sequentially. An orthogonal M sequence generator generates an M sequence with the m bits of data to be sent that are stored in the shift register as an initial value, then generates an orthogonal M sequence from that M sequence. A clock signal generator generates a clock signal of frequency $2^m$ times the data rate of the data to be sent. The orthogonal M sequence generator operates in accordance with that clock signal.

14 Claims, 22 Drawing Sheets

| | | | | |
|---|---|---|---|---|
| T0 | 1 | 1 | 1 | 1 |
| T1 | 1 | 1 | 1 | 0 |
| T2 | 1 | 1 | 0 | 1 |
| T3 | 1 | 0 | 1 | 0 |
| T4 | 0 | 1 | 0 | 1 |
| T5 | 1 | 0 | 1 | 1 |
| T6 | 0 | 1 | 1 | 0 |
| T7 | 1 | 1 | 0 | 0 |
| T8 | 1 | 0 | 0 | 1 |
| T9 | 0 | 0 | 1 | 0 |
| T10 | 0 | 1 | 0 | 0 |
| T11 | 1 | 0 | 0 | 0 |
| T12 | 0 | 0 | 0 | 1 |
| T13 | 0 | 0 | 1 | 1 |
| T14 | 0 | 1 | 1 | 1 |
| T15 | 1 | 1 | 1 | 1 |

OUTPUT SEQUENCE

| DATA TO BE TRANSMITTED | ... | 0 | 1 | 1 | 1 | ... |
|---|---|---|---|---|---|---|
| SW 52 (INPUT SIDE) | | | | | | |
| SW 44 (OUTPUT SIDE) | | | | | | |
| REGISTER VALUE WHEN SW52 IS "H" | ... | 0100 | 1001 | 0011 | | ... |
| OUTPUT | 00100110101111100 | 01001101010111000 | 00011010111110001 | | | |

FIG. 8

| REGISTER VALUES | SPREAD CODE |
|---|---|
| 0000 | 0000000000000000 |
| 0001 | 0000100110101111 |
| 0010 | 0001001101011110 |
| 0011 | 0001101011110001 |
| 0100 | 0010011010111100 |
| 0101 | 0010111101111100 |
| 0110 | 0011101111000010 |
| 0111 | 0011110001001101 |
| 1000 | 0100100110101111 |
| 1001 | 0100110101111000 |
| 1010 | 0101011100010011 |
| 1011 | 0101101111000110 |
| 1100 | 0110001001101011 |
| 1101 | 0110101111000100 |
| 1110 | 0111000100110101 |
| 1111 | 0111100010011010 |

$T_0 \uparrow$ $T_1 \uparrow$ $T_2 \uparrow$ $T_3 \uparrow$

DATA SENT : 0000000000000000 0000100110101111 0001101011110001 0011101111000010...
⊕ NOISE : 0000000000000001 0000000000000000 1000000000000000 0000000000000001...
DATA RECEIVED : 0000000000000001 0000100110101111 1001101011110001 0011101111000011...

$T_0$ $T_1$ $T_2$ $T_3$

SPREAD ENCODING DEVICE AND METHOD

BACKGROUND OF THE INVENTION

1. Field of the Invention

This invention relates to a device and method for spreading and encoding of data signals. More specifically, it relates to a device and method for spreading and encoding of data signals by the CDMA method in wireless communication.

2. Description of the Related Art

Mobile communications are coming into widespread use. The communication methods that are used include FDMA (Frequency Division Multiple Access), TDMA (Time Division Multiple Access) and CDMA (Code Division Multiple Access). Among these, CDMA is attracting considerable attention as a standard next generation communication method.

In CDMA, by using a characteristic PN (Pseudo Noise) sequence for each user, it becomes possible for a plurality of users to share the same frequency simultaneously. On the sending side, the data to be transferred are multiplied by a PN sequence that has a faster frequency than the transferred data and then output. This spreads a bandwidth of the sending frequency band. That is to say, the spectrum is spread. On the receiving side, the transferred data are reproduced by multiplying the received data by a PN sequence that is the same as the PN sequence that was used on the sending side. The transferred data cannot be reproduced correctly by multiplying the received data by any PN sequence that is different from the PN sequence that was used on the sending side.

CDMA has the following characteristics. First, since a plurality of users share the same frequency at the same time, the number of user channels in a unit bandwidth can be increased. Second, since the sending frequency has a broad bandwidth, the effect of fading is slight. Third, since the data cannot be correctly reproduced unless the same PN sequence is used on the sending side and the receiving side, secrecy is maintained in the conversation.

However, since wireless frequency resources are (frequency bandwidth is) limited, as the number of mobile communications users increases, the number of channels in a unit bandwidth tends to increase. When the number of channels in a unit bandwidth thus increases, it becomes more difficult to correctly reproduce the transferred data on the receiving side. An error correcting code is frequently used to deal with this problem. An error correcting code adds a redundancy of the data to the data to be transferred.

Error correcting codes are sometimes used in CDMA. An existing encoder that provides an error correcting code in CDMA is shown in FIG. 1. The convolutional encoding section 501 is one form of error-correcting encoder. That is to say, the convolutional encoding section 501 provides redundancy to the data to be sent which are generated by the data generator 502. The convolutional encoding section 501 executes, for example, Hadamard encoding. In Hadamard code, the convolutional encoding section 501 has, for example, a shift register that stores the data to be sent while shifting the data one bit at a time, and a Walsh sequence generator that generates Walsh sequences. The spreading section 503 multiplies the output of the convolutional encoding section 501 by a PN sequence.

The error correcting code and the spreading code that are provided in CDMA are described in detail in references 1 and 2. In references 1 and 2, this method is called the LROCC (Low Rate Orthogonal Convolution Code).

Reference 1: Andrew J. Viterbi "Very Low Rate Convolutional Codes for Maximum Theoretical Performance of Spread-Spectrum Multiple-Access Channels", IEEE Journal on Selected Areas in Communications, Vol. 8, pp. 641–649 May 1990.

Reference 2: R. F. Ormondroyd and J. J. Maxey "Performance of Low-Rate Orthogonal Convolution Codes in DS-CDMA Application" IEEE Transactions on Vehicular Technology, Vol. 46, pp. 320–328 May 1997.

When an error correcting code and spreading code are provided in CDMA, until now, as shown in FIG. 1, the section that executes error correcting encoding and the section that executes spreading have been independent of each other. For this reason, there is the problem that the scale of the circuitry becomes large.

As noted above, an error correcting code provides redundancy to data, so the amount of data that are actually transferred is increased, and the bandwidth is essentially spread. Consequently, even when the data are not multiplied by a PN sequence as in the example shown in FIG. 1, the data are spread. However, as discussed in reference 2, if only an existing type of error correcting encoder (in reference 2, a convolutional encoder equipped with an Hadamard encoder) is used and PN sequence multiplication processing is not executed, a peak is produced in the spectrum of data that are sent.

A peak in the spectrum causes the following problem. In CDMA, the secrecy of conversation is increased by making it appear as though the transferred data are noisy, but when a peak is produced in the spectrum, it becomes a source of interference, leading to a deterioration in the error rate. In addition, the equipment on the receiving side generally is configured so that an amplifier is used to amplify the received signal and then the desired signal is extracted; when a peak occurs in the spectrum, that peak is faithfully reproduced, making it necessary to have high priced equipment.

SUMMARY OF THE INVENTION

The purpose of this invention is to provide a device and a method to generate spread code data that will maintain good secrecy in conversation without increasing the scale of the circuitry or requiring high priced components.

The spread encoding device of this invention spreads data to be sent. It includes an m-bit shift register that stores the data to be sent, and a spreading unit for generating an M-sequence of which the period is $2^m-1$, using the m bits of data to be sent that are stored in the shift register as an initial value, for generating an orthogonal M-sequence, and for outputting it as the spread sequence of the data to be sent.

In the configuration described above, the data to be sent are stored in the shift register sequentially, 1 bit at a time or several bits at a time. Then, every time new data to be sent are input into the shift register, the spreading unit generates an M-sequence using the m bits of data to be sent stored in that shift register as the initial value. Consequently, the data to be sent are spread by a factor of $2^m$ at the same time that they are convolutionally encoded.

The spread encoding device of another embodiment of this invention includes an m-bit shift register that stores the data to be sent; a storing unit for storing a channel identifier that identifies a communication channel to which the data to be sent are assigned; and a spreading unit for generating an M sequence of period $2^{(m+n)}-1$ with the m+n bits of data consisting of the m bits of data to be sent that are stored in the shift register and the n bit channel identifier that is stored in the storing unit as an initial value, for generating an orthogonal M sequence from that M sequence, and for outputting the orthogonal M sequence as the spread sequence of the data to be sent.

In the configuration described above, if the channel identifiers are different, then even if the m bits of data to be sent that are stored in the shift register are the same, a different orthogonal M-sequence will be generated. Consequently, the receiving device that receives the spread sequence that is generated by this spread encoding device can identify the user who sent the data.

BRIEF DESCRIPTION OF THE DRAWINGS

FIG. 8 is a diagram explaining the action of the 2nd embodiment;

FIG. 20A is a diagram showing the relationship between the data that are sent and the spread code.

FIG. 20B is a diagram explaining the noise on the transmission path;

DETAILED DESCRIPTION OF THE INVENTION

Figure 1:
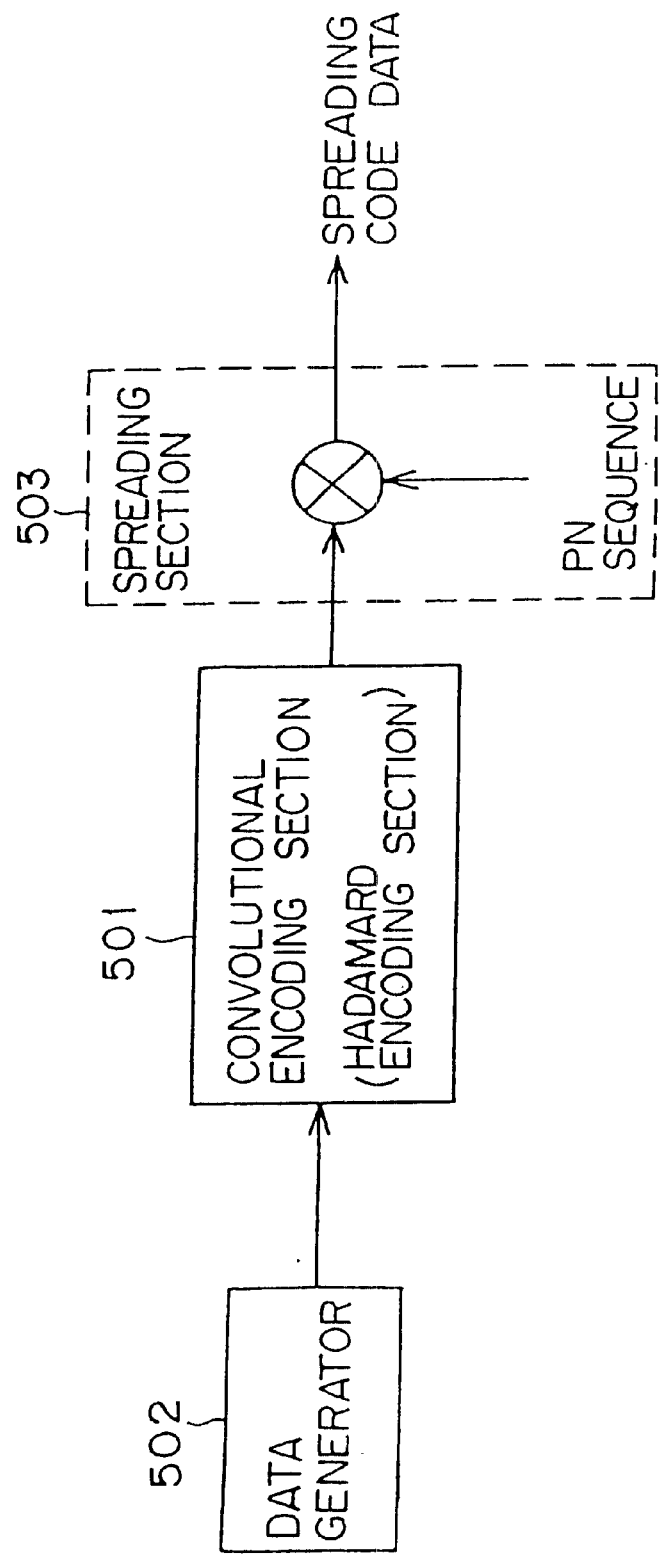
FIG. 1 is a configuration diagram of an existing type of encoding device that provides error correcting codes and spread codes.
Figure 2:
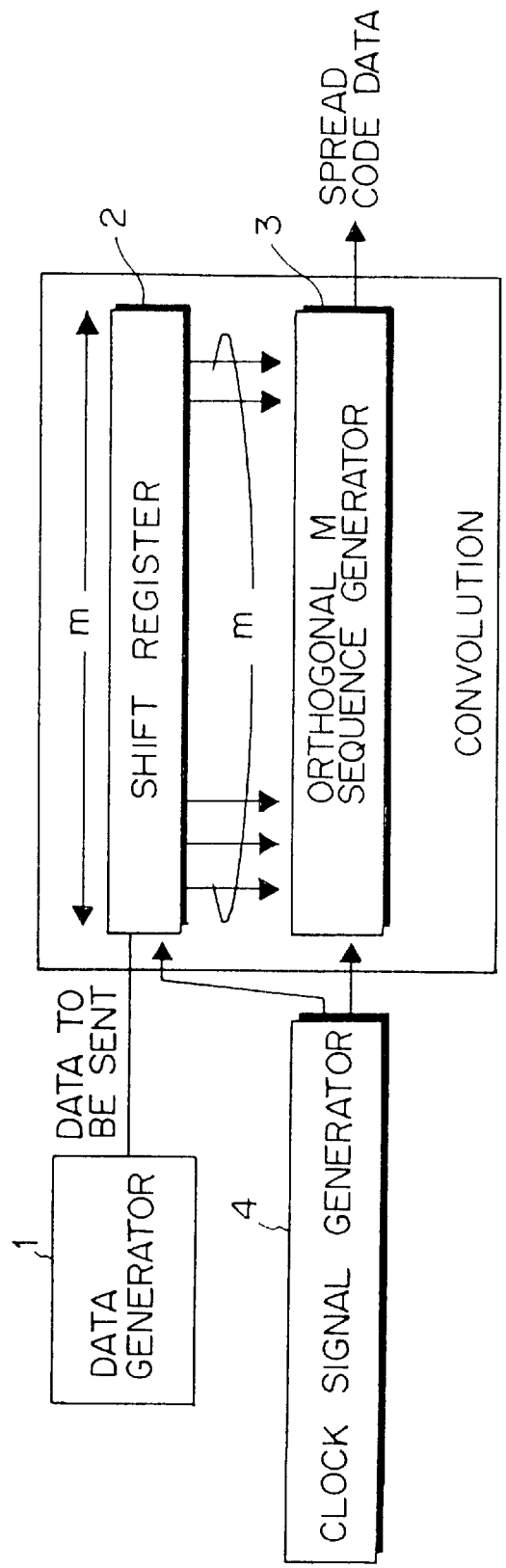
FIG. 2 shows the basic configuration of the spread encoding device of this invention.

FIG. 2 is a diagram that shows the basic configuration of the spread encoding device of this invention. The spread encoding device of this invention has a configuration that performs convolutional encoding of the data to be sent and, at the same time, spreading of the spectrum.

The data generator 1 generates the data to be sent. The shift register 2 stores the data to be sent that were generated by the data generator 1 sequentially, 1 bit at a time. This shift register 2 can store m bits of data to be sent. The orthogonal M sequence generator 3 generates an M sequence (maximum-length sequence) using the m bits of data to be sent that are stored in the shift register 2 as an initial value. The clock generator 4 generates clock signals that determine the operating speeds of the shift register 2 and the orthogonal M sequence generator 3, respectively. The frequency of the clock signal that is fed to the orthogonal M sequence generator 3 is $2^m$ times the frequency of the clock signal that is fed to the shift register 2 (shift clock). The frequency of the clock signal that is fed to the shift register 2 is the same as the data rate of the data to be sent.

In the configuration described above, the output of the orthogonal M sequence generator 3 forms spread code data corresponding to the m bits of data to be sent that are stored in the shift register 2. These spread code data are obtained by performing convolutional encoding of the data to be sent and, at the same time, spreading their spectrum by a factor of $2^m$. Here, we will simply explain the convolutional code and M sequences.

Figures 3A, 3B:
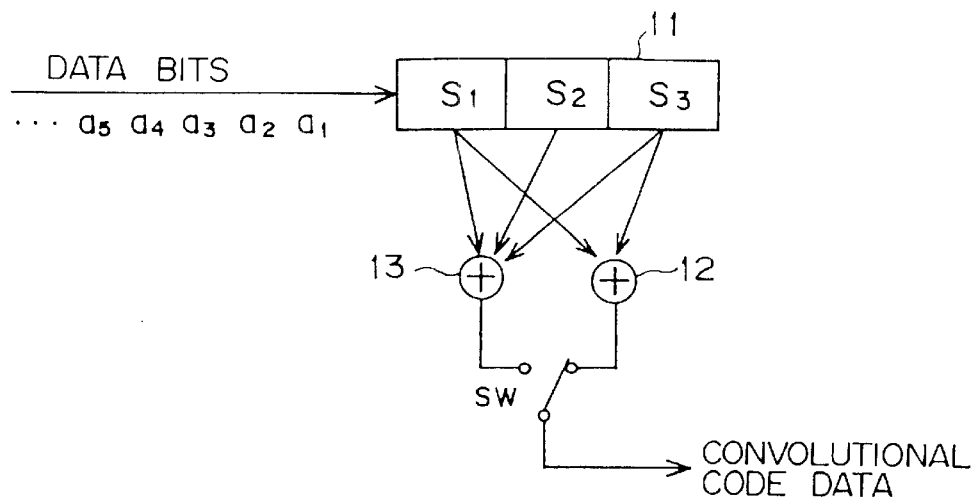
FIGS. 3A and 3B are diagrams explaining a convolutional code.

FIGS. 3A and 3B explain convolutional code. Convolutional code is one kind of error correcting code. It is a method of encoding in which code words are generated based on a plurality of data blocks. There are various types of convolutional encoders available. To simplify the present explanation, we consider a configuration that includes a shift register that stores m bits and mod2 adders.

FIG. 3A shows an example in which the data bits a1, a2, a3, a4, a5, . . . are input sequentially, 1 bit at a time, into a convolutional encoder that has a 3-bit shift register 11 and two mod2 adders 12 and 13. This convolutional encoder outputs a bit that indicates the result of adding by the adder 12 and a bit that indicates the result of adding by the adder 13 as convolutional code data corresponding to the 3 bits of data that are stored in the shift register 11.

We will now explain what happens concretely, referring to FIG. 3B. At time T0, assuming that "0, 0, 0" are set as the an initial value in the shift register 11, the results of addition by the adder 12 and the adder 13 are both 0, so "0, 0" are output. Next, if "a1" is input at time T1, the data stored in the shift register 11 become "a1, 0, 0". The output of the convolutional encoder in this state becomes "a1, a1". Subsequently, similarly the convolutional encoder shown in FIG. 3A outputs 2 bits of convolutional code data, determined by the state of the data in the shift register 11, every time 1 bit of data is input, with that timing.

Thus, every time new bit data are input, the convolutional encoder performs convolution and generates data using part of the bit sequence which determines the immediately preceding convolutional code data.

The spread encoding device of this invention uses a convolutional code such as that described above. In this disclosure, "convolutional code" includes all processing that gives redundancy to the data which are input sequentially; it is not limited to the configuration using mod2 adders shown in FIG. 3A.

Figure 4A:
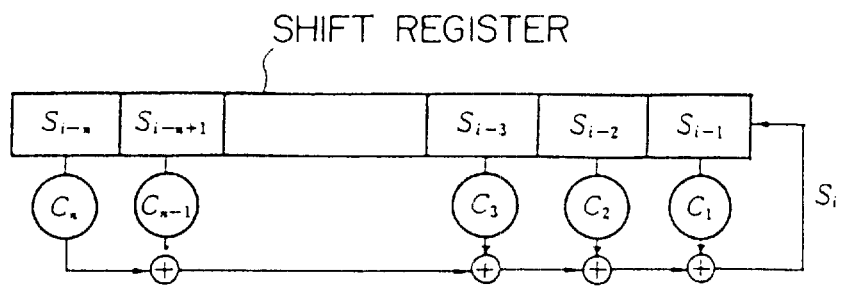
FIGS. 4A and 4B are diagrams explaining an M-sequence.
Figure 4B:
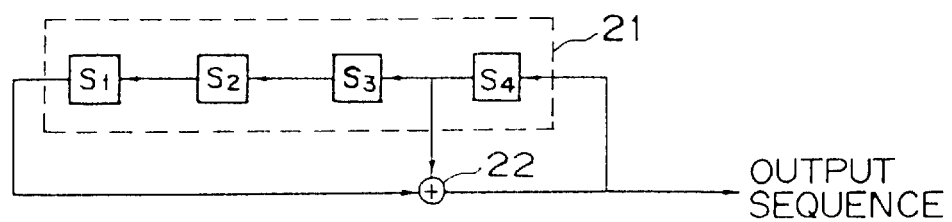

FIGS. 4A and 4B explain an M sequence. An M sequence generator basically consists of a linear feedback register such as the one shown in FIG. 4A. In FIG. 4A, each of C1 to Cn has the value "0" or "1", indicating whether or not the shift register and the adder (an adder used for exclusive logical summation) are connected to each other. In the case in which an m bit shift register is used, the maximum period of the sequence generated by the linear feedback register is well known to be $2^m-1$.

FIG. 4B explains the action of the M sequence generator. Here, a 4-bit shift register 21 is used. In addition, the output of an adder 22 is fed back to bit S4 in the shift register 21. In this configuration, the output of the adder 22 becomes the output of the M sequence generator. This action will be explained in more detail below.

Assume that at time T0, "1, 1, 1, 1" is stored in the shift register 21. Next, the data stored in the shift register 21 are shifted by 1 bit at time T1. At this time, the adder 22 outputs the first bit of the M sequence based on the data that were stored in the shift register at time T0. Here, "0" is output. Then the output of this adder 22 is written into bit S4 of the shift register 21. As a result, "1, 1, 1, 0" are stored in the shift register 21.

Subsequently, the data that comprise the M sequence are output sequentially by repetition of the action described above. Then, at time T15, the state of the shift register 21 (the 4 bits of data that are stored in the shift register 21) returns to the state at time T0. That is to say, the state of the shift register 21 varies with period $2^4-1$. The data sequence that is output in 1 period of this shift register 21 is an M sequence. Thus, the M sequence generator outputs a sequence of length $2^4-1$ with respect to the n bits of data.

The spread encoding device of this invention is basically realized by functionally combining the convolutional encoder shown in FIG. 3A and the M sequence generator shown in FIG. 4A. Specifically, for example, it can be realized through a unique correspondence between each bit of the shift register of the convolutional encoder and each bit of the shift register of the M sequence generator. Alternatively, the spread encoding device of this invention can be realized by having both devices share the same shift generator.

In this kind of configuration, every time 1 bit of data to be sent is input into the spread encoding device, an M sequence corresponding to m bits of data being stored in the shift register, including that input bit, is generated. As was explained referring to FIG. 4B, this M sequence is a data sequence of length $2^m-1$.

The spread encoding device of the embodiment of this invention, as will be described in more detail below, adds a specified value (in this embodiment this value is "0") to the M sequence that is generated corresponding to the m bits of data to be sent to generate a data sequence of length $2^m$; that data sequence is then output as the spread code data corresponding to the m bits of data to be sent. This data sequence of length $2^m$ is output every time 1 bit of data to be sent is input to the spread encoding device. As a result, the spectrum of data to be sent is spread by a factor of $2^m$. A data sequence of length $2^m$ that is generated by adding "0" or "1" to an M sequence of length $2^m-1$ is called an "orthogonal M sequence". Orthogonal M sequences have a cross-correlation of 0.

Figure 5:
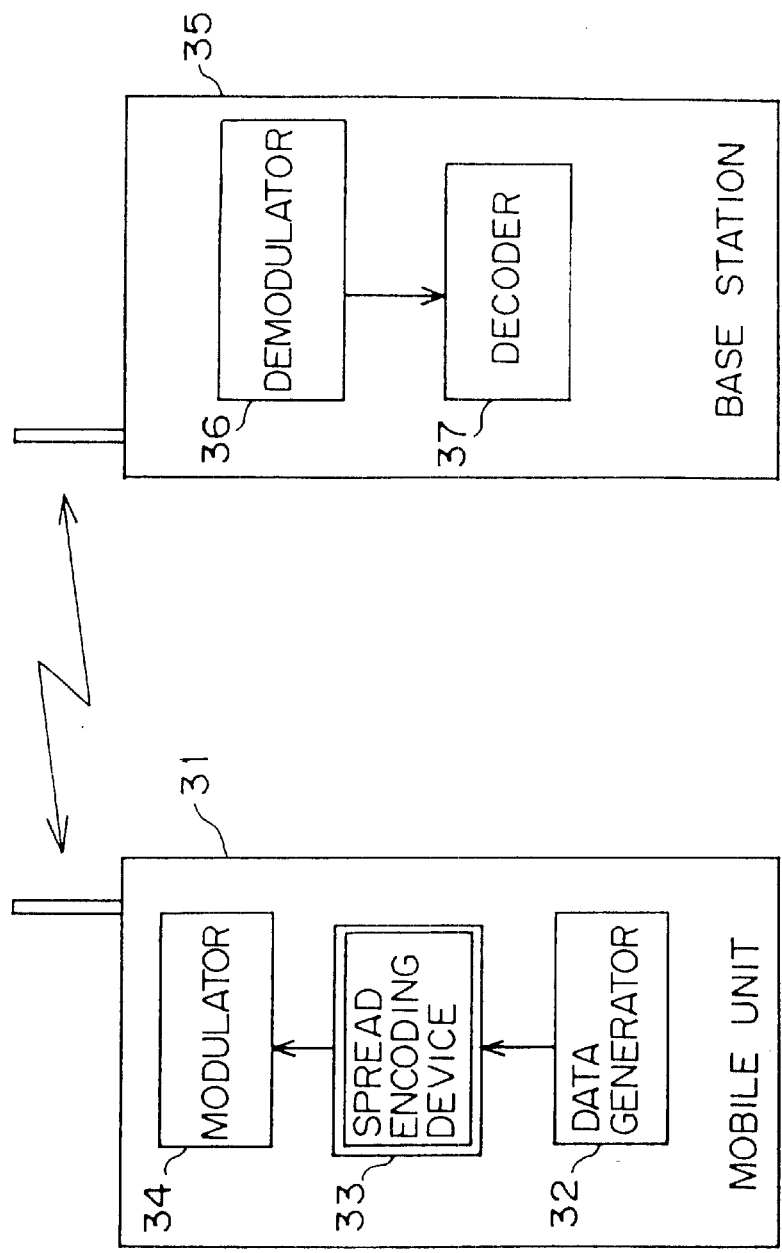
FIG. 5 is a diagram showing one application of the spread encoding device of this invention.

FIG. 5 shows an example of the application of the spread encoding device of this invention. In the example shown in FIG. 5, the spread encoding device of this invention is used for a mobile communication system.

The mobile unit 31 sends data to and receives data from the base station 35 by wireless communication according to the CDMA system. The data generator 32 digitizes, for example, voice data input by the user to the mobile unit 31; if necessary those data may in addition be compressed. The spread encoding device 33 is a device that is directly related to this invention. It performs convolutional encoding processing on the output of the data generator 32, and at the same time uses the M sequence to disperse the spectrum. The modulator 34 modulates and outputs the output of the spread encoding device 33. The demodulator 36 demodulates the signal received from the mobile unit 31. The decoder 37 is, for example, a Viterbi decoder which decodes the output of the demodulator 36.

In general, in a mobile communication system, data are transmitted in both directions between the mobile unit and the base station. Consequently, although not shown in the drawings given here, the base station 35 has a data generator, a spread encoding device and a modulator; the mobile unit 31 has a demodulator and a decoder. The applications of this invention are not limited to mobile communication systems such as the one shown in FIG. 5; it is widely applicable to systems that spread and transmit data.

Figure 6:
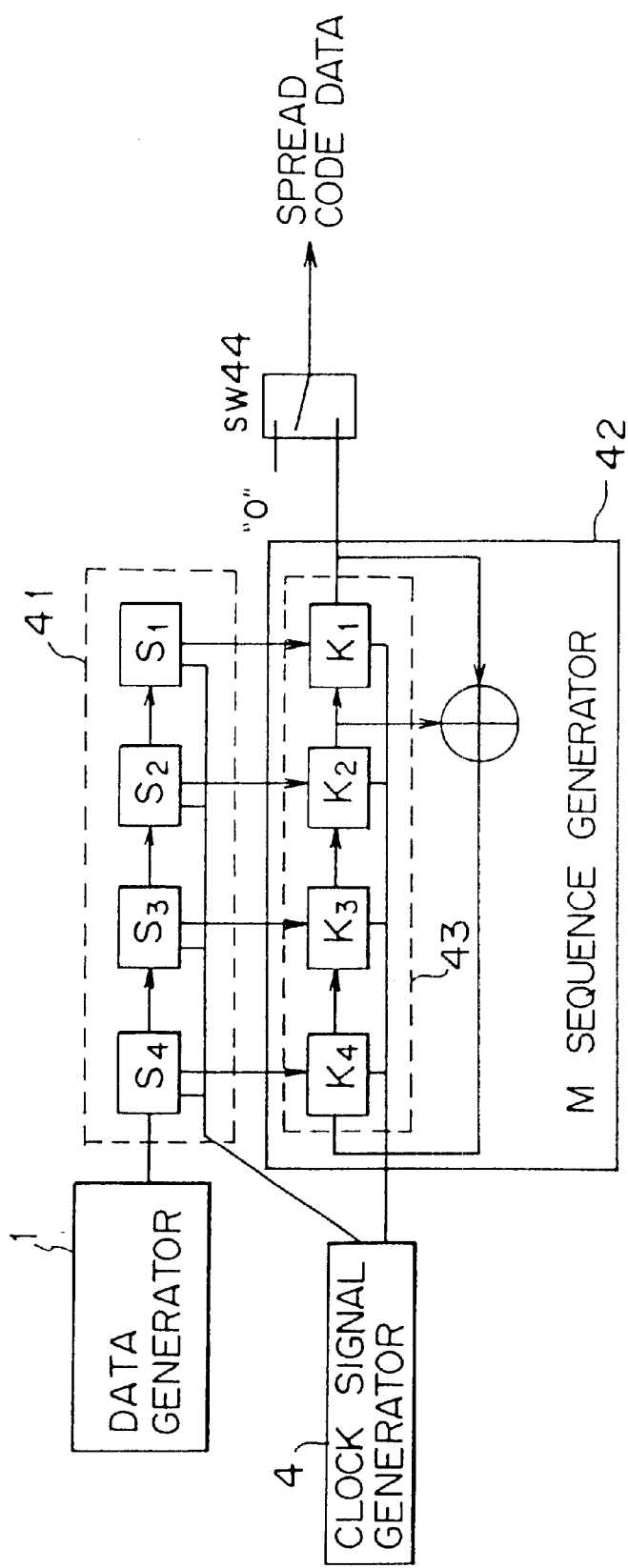
FIG. 6 is a configuration diagram of the 1st embodiment.

FIG. 6 is a configuration diagram of the 1st embodiment. Here, we will explain a configuration in which a 4-bit shift register is used. The data generator 1 and the clock generator 4 are as was explained with reference to FIG. 2. The frequency of the clock signal fed to the M sequence generator 42 is 16 ($2^4$) times the frequency of the clock signal fed to the shift register 41. The frequency of the clock signal fed to the shift register 41 is the same as the data transmission rate.

The data to be transmitted, generated by the data generator 1, are input sequentially to the shift register 41 1 bit at a time such that 4 bits of data to be transmitted have been stored. The M sequence generator 42 has a shift register 43 that has the same number of stages as the shift register 41. The shift register 43 is a generator polynomial register. Each stage of the shift register 41 is in one-to-one correspondence with the stages of the shift register 43. Every time one bit of data to be transmitted is input into the shift register 41, the 4 bits of data to be transmitted stored in the shift register 41 are written into the shift register 43. That is to say, the data to be transmitted stored in S1 to S4 of the shift register 41 are written into K1 to K4 of the shift register 43.

The M sequence generator 42 generates an M sequence of 15 ($2^4-1$) bits with the 4 bits of data to be transmitted that have been written into the shift register 43 as the initial value. The method of generating this M sequence is as was explained with reference to FIGS. 4A and 4B. Note that in general, 1 or more adders are necessary to form an M sequence generator; in this embodiment and in the embodiments to be discussed below, the adders in the M sequence generator are exclusive ORs or mod2 adders.

The switch 44 has 2 data input terminals. The input to one of the data input terminals is fixed at "0"; the output of the M sequence generator 42 is input to the other data input terminal. The switch 44 divides the time allotted for transmitting 1 bit of data into 16 time slots. Then "0", which has been preset, is selected and output in the 1st slot; and the M sequence of 15 bits (or 15 chips) that has been generated by the M sequence generator 42 is selected and output in the 2nd through 16th slots. In this way the switch 44 outputs a 16-bit data sequence for every bit of data to be transmitted. This 16-bit data sequence (consisting of "0" added to a 15-bit M sequence) is the orthogonal M sequence.

Subsequently, every time 1 bit of data to be transmitted is input into the shift register 41, an orthogonal M sequence corresponding to the 4-bit data pattern that is stored in the shift register 41 at that time is output.

Figure 7:
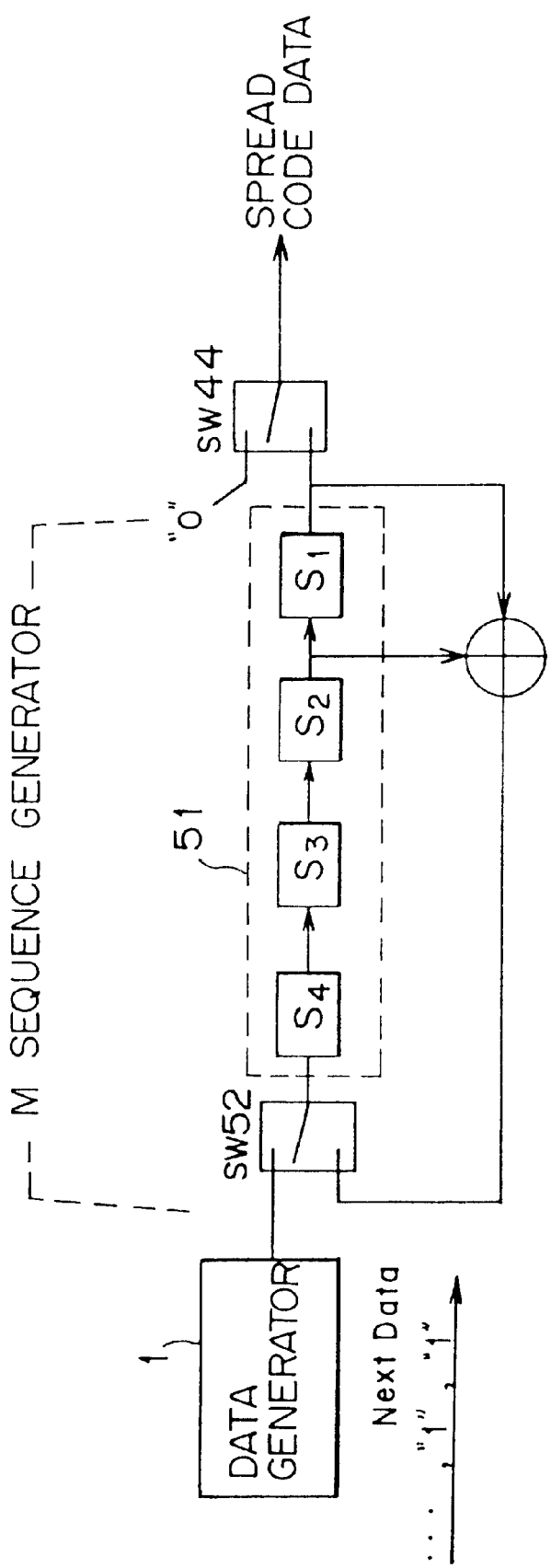
FIG. 7 is a configuration diagram of the 2nd embodiment.

FIG. 7 shows the 2nd embodiment of this invention. Whereas the 1st embodiment had a configuration in which there are separate shift registers for input of the data to be transmitted and for use as the generation polynomial shift register, in the 2nd embodiment the functions of these two shift registers are realized in one shift register.

The shift register 51 has both the function of receiving and storing the data to be transmitted, 1 bit at a time; and the function of serving as the generator polynomial register. The switch 52 has two data input terminals. The output of the data generator 1 is input into one of the data terminals; the M sequence generator feedback data are input into the other data input terminal. The switch 52 divides the time allotted for transmitting 1 bit of data into 16 time slots. Then the output of the data generator 1 is selected and output in the 1st slot; and the M sequence generator feedback data are selected and output in the 2nd to 16th time slots. The output of the switch 52 is written into the end of the shift register 51.

The action of the 2nd embodiment will now be explained with reference to FIG. 8. Here, we will explain the action when "0" is newly input as data to be transmitted, the data stored in the shift register 51 (S1 to S4) become (0, 1, 0, 0), and subsequently.

First, the switch 52 changes to "H", and the data bit "0" to be sent is written into stage S4 in the shift register 51. Thus, the state of the shift register 51 becomes (S1 to S4)=(0, 1, 0, 0). At this time, the switch 44 also changes to "H", and "0" is output as a first bit of the spread code data.

After that, the switches 52 and 44 both change to "L". Then an M sequence of 15 bits length, with the 4 bits of data to be sent that are stored in the shift register 51 as an initial value, is generated and output. As in the case of the 1st embodiment, by this action an orthogonal M sequence is output.

As was explained with reference to FIG. 4B, an M sequence generator that has an m-bit shift register operates with a cyclic period of $2^m-1$. In the example shown in FIG. 4B, the data stored in the shift register at time T15 become the same as the data stored in the shift register at time T0. Consequently, in FIG. 7, the data stored in the shift register 51 change every time 1 bit of an M sequence is output 1 bit at a time, as shown in FIG. 4B; the data stored in the shift register 51 immediately after a 15-bit sequence is output become the same as the data stored in the shift register 51 immediately before that 15-bit M sequence was output. That is to say, the state of the shift register 51 immediately after the 15-bit M sequence is output returns to (S1 to S4)=(0, 1, 0, 0).

Next, the data stored in the stages S2 to S4 of the shift register 51 are shifted to the stages S1 to S3, respectively; and "1" is written into the stage S4 by means of the switch 52 switching to the "H" level. In this way, the state of the shift register 51 becomes (S1 to S4)=(1, 0, 0, 1). Corresponding to this new state of the shift register 51, by the same action as described above one of the data input terminals of the switch 44 is set to "0", and an M sequence generated using the newly stored 4 bits as an initial value is output.

Thus, in the 2nd embodiment, the generator polynomial register is used to directly receive the data that are to be sent, so that compared to the 1st embodiment the number of shift registers is decreased. That is to say, the 2nd embodiment contributes to decreasing the scale of the circuitry of the spread encoding device.

Figure 9:
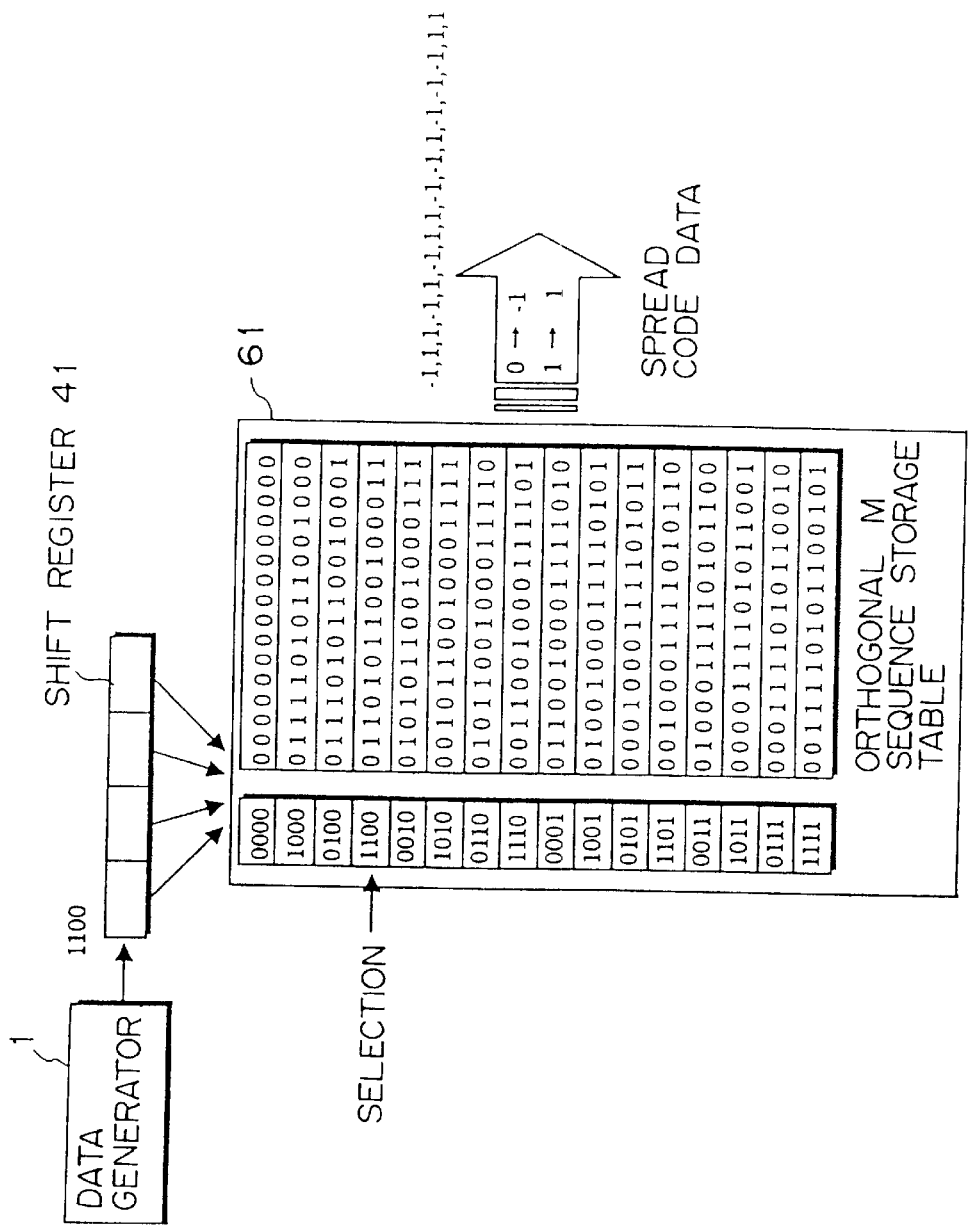
FIG. 9 is a configuration diagram of the 3rd embodiment.

FIG. 9 is a configuration diagram of the 3rd embodiment of this invention. The 1st and the 2nd embodiments are configured so that a generator polynomial register is used to generate M sequences. In contrast, in the 3rd embodiment, orthogonal M sequences corresponding to all possible patterns that the m bits of data can take are found in advance and stored in a table, then, with the data to be sent which are input as a key, the corresponding orthogonal M sequence is taken from that table and output.

The orthogonal M sequence storage table 61 stores the orthogonal M sequences that can be obtained when m arbitrary bits of data are given as an initial value, with each orthogonal M sequence matched to its corresponding m bit data pattern. In order to store orthogonal M sequences that correspond to all of the data patterns, if the shift register has m stages, the orthogonal M sequence storage table 61 stores orthogonal M sequences corresponding to $2^m$ patterns.

The action of the 3rd embodiment is as follows. As in the 1st embodiment, the data to be sent are stored sequentially 1 bit at a time in the shift register 41. When new data to be sent are input to the shift register 41, an orthogonal M sequence is taken from the orthogonal M sequence storage table 61, with the m bits of data to be sent that are stored in the shift register 41 at that time as a key. In FIG. 9, an example for the case in which "1, 1, 0, 0" is stored in the shift register 41 is shown. In this case, the orthogonal M sequence storage table 61 is searched with the 4 bits of data that are stored in the shift register 41 as a key, and the orthogonal M sequence that is stored on the 4th row of the table shown in FIG. 9 is selected and output.

In FIG. 9, the spread code data to be output are converted to 2-level data consisting of the values "+1" and "−1". This conversion is performed for the purpose of data modulation, and may be performed in a modulator provided separated from this spread encoding device.

Thus, in the 3rd embodiment, the configuration is such that a previously formed orthogonal M sequence is selected based on the data to be sent, so that it is not necessary to generate an M sequence using the shift register 1 bit at a time, and speeding up of the spread processing can be expected.

Next, we will explain an embodiment that envisions a situation in which a plurality of users are sending and receiving data at the same time. In mobile communications, in general, identifiers are used for the purpose of identifying a plurality of communication channels that are established at the same time. An identifier is, for example, dynamically assigned to the communication channel on which a call is established at the time the call is established. Hereafter, the identifier that identifies a communication channel will be called the "user ID".

Figure 10:
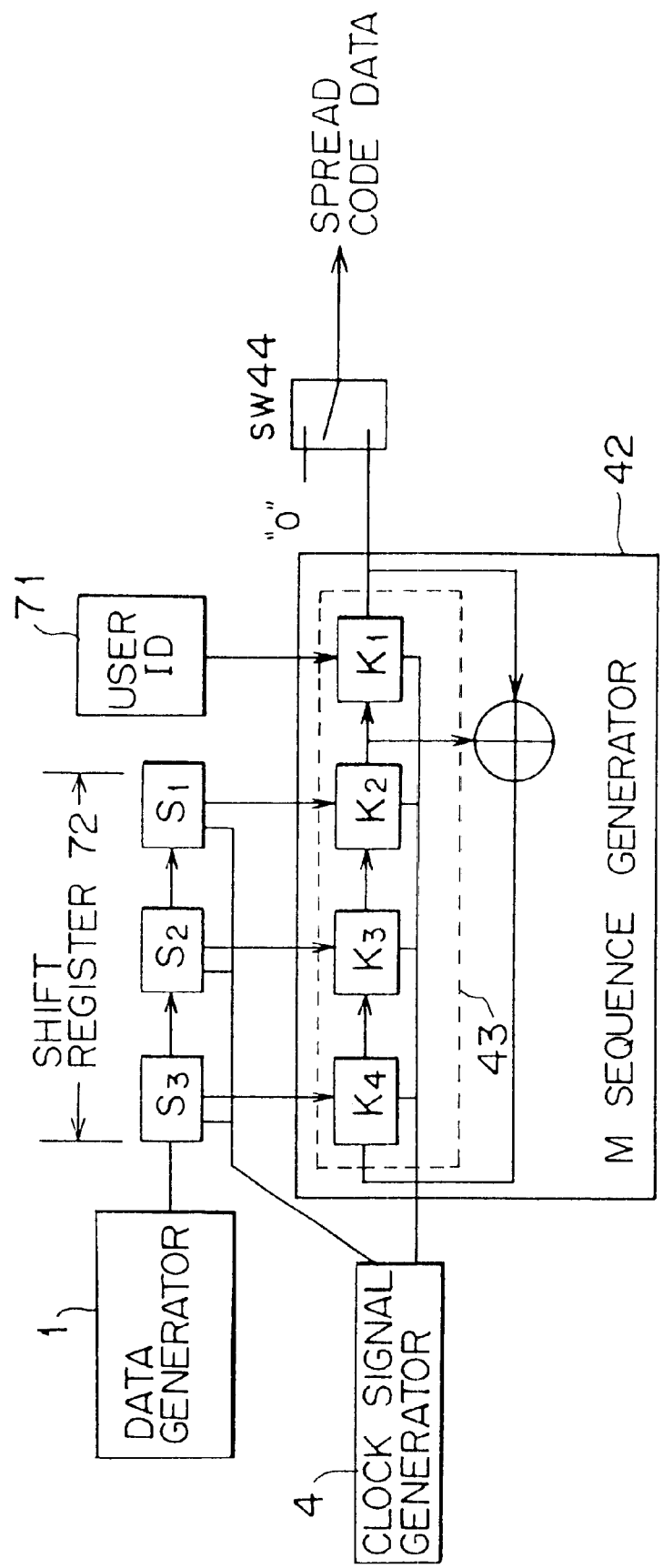
FIG. 10 is a configuration diagram of the 4th embodiment.

FIG. 10 is a configuration diagram of the 4th embodiment of this invention. The spread encoding device of the 4th embodiment has basically the same configuration as that of the 1st embodiment, but it also has a user ID register 71 for the purpose of storing a user ID.

A user ID is an identifier for the purpose of identifying the communication channel between the user and the network. The user ID is determined by the network (the base station) at the time the call is established; when the call is established by the base station, it is posted to the mobile communication unit. Consequently, user IDs that are determined by the network are written into the user ID register 71. In the example shown in FIG. 10, the user ID consists of 1 bit. It is well known that if each user ID consists of k bits, then $2^k$ users can be identified. The user ID register 71 may, for example, be reset when the call is completed.

The shift register 72, like the shift register 41 in the 1st embodiment, stores the data to be sent sequentially, 1 bit at a time. However, the number of stages in the shift register 72 is less than the number of stages in the shift register 43 that is incorporated into the M sequence generator 42. The sum of the number of bits in the shift register 72 and the number of bits in the user ID register 71 is the same as the number of bits in the shift register 43.

The action of the 4th embodiment is basically the same as that of the 1st embodiment. However, in the 4th embodiment, every time new bit data to be sent is input into the shift register 72, the data to be sent that are stored in bits S1 to S3 of the shift register 72 are written into bits K2 to K4 of the shift register 43, and, at the same time, the user ID that is stored in the user ID register 71 is written into bit K1 of the shift register 43. Then the M sequence generator 42 generates an M sequence with a combined value of the 1-bit user ID and the 3 bits of data to be sent as the initial value. Consequently, a different sequence is generated for each user ID. That is to say, even if, for example, the data to be sent that are stored in the shift register 72 are the same, if the user ID is different, then an M sequence whose phase is different will be generated.

When the 4th embodiment is generalized, it becomes as follows. If the number of stages of the shift register is m, and the number of bits in the user ID register is n, then an (m+n) bit data sequence is loaded into the generator polynomial register of the M sequence generator. In this case, the period of the generator polynomial is $2^{(m+n)}-1$. Consequently, for example, an orthogonal M sequence of length $2^{(m+n)}$ is generated by adding "0". The sequences generated in this way are mutually orthogonal, so it is possible to identify the user.

Figure 11:
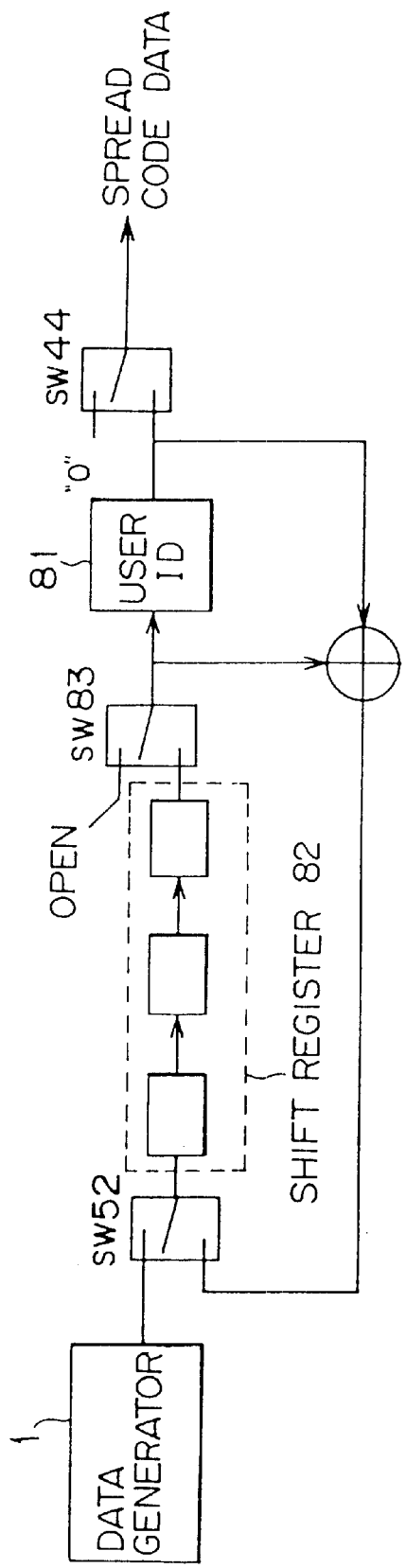
FIG. 11 is a configuration diagram of the 5th embodiment.

FIG. 11 is a configuration diagram of the 5th embodiment of this invention. The spread encoding device of the 5th embodiment is basically the same as that of the 2nd embodiment, but it has a user ID register 81 to store a user ID. The user ID determined by the network is written into the user ID register 81. The shift register 82 stores the data to be sent and, at the same time, also acts as the generator polynomial register for the purpose of generating M sequences. A switch 83 is installed between the shift register 82 and the user ID register 81; as necessary the shift register 82 and the user ID register 81 can be connected to form 1 shift register.

We will now explain the action of the 5th embodiment. First, the switch 52 selects the output of the data generator 1, and the switch 44 selects "0". At this time, the switch 83 is switched to the open (non-connected) position. As a result, new data are written into the shift register 82, and, at the same time, "0" is output as the 1st bit of the orthogonal M sequence. Note that new data are not written into the user ID register 81 because the switch 83 is switched to the open (non-connected) position; the user ID remains stored unchanged.

Next, the switch 52 selects the feedback data from the adder, the switch 83 selects the output from the shift register 82, and the switch 44 selects the output of the user ID register 81. When the switch 83 selects the output of the shift register 82, the user ID register 81 functions as part of the combined (m+n) stage shift register formed by connecting the shift register 82 to the user ID register 81. Here, it is assumed that the shift register 82 has m stages and the user ID register 81 has n bits. In the example shown in FIG. 11, m=3 and n=1. Then, in this condition, a clock signal having a frequency $2^{(m+n)}$ times the data rate of the data to be sent is used to execute the generator polynomial. In FIG. 11, the circuit that generates this clock signal is omitted.

Through the action described above, an M sequence is generated with the data to be sent that are stored in the shift register 82 and the user ID that is stored in the user ID register 81 as an initial value. This M sequence is selected by the switch 44 and then output following the "0" that was output previously. As a result, an orthogonal M sequence that corresponds to the data to be sent and the user ID is output.

Note that an M sequence generator that has an (m+n) bit shift register operates with a period of $2^{(m+n)}-1$. Consequently, in FIG. 11, immediately after the $2^{(m+n)}-1$-bit M sequence is output, the data stored in the shift register 82 and the user ID register 81 become the same as the data that were stored in the shift register 82 and the user ID register 81 immediately before that $2^{(m+n)}-1$-bit M sequence was output. That is to say, at the timing immediately after the $2^{(m+n)}-1$-bit M sequence is output, the shift register 82 returns to the state of storing the data to be sent that were output from the data generator 1; similarly, the user ID register 81 returns to the state of storing the user ID.

After that, the switches 52, 83 and 44 return to their initial states, and a new bit of data to be sent is received from the data generator 1.

Next, we will explain the spread encoding device that is installed in a device that sends data to a plurality of destinations simultaneously. As one example of a device that sends data to a plurality of destinations simultaneously, one can conceive of, for example, the base station 35 that is shown in FIG. 5.

Figure 12:
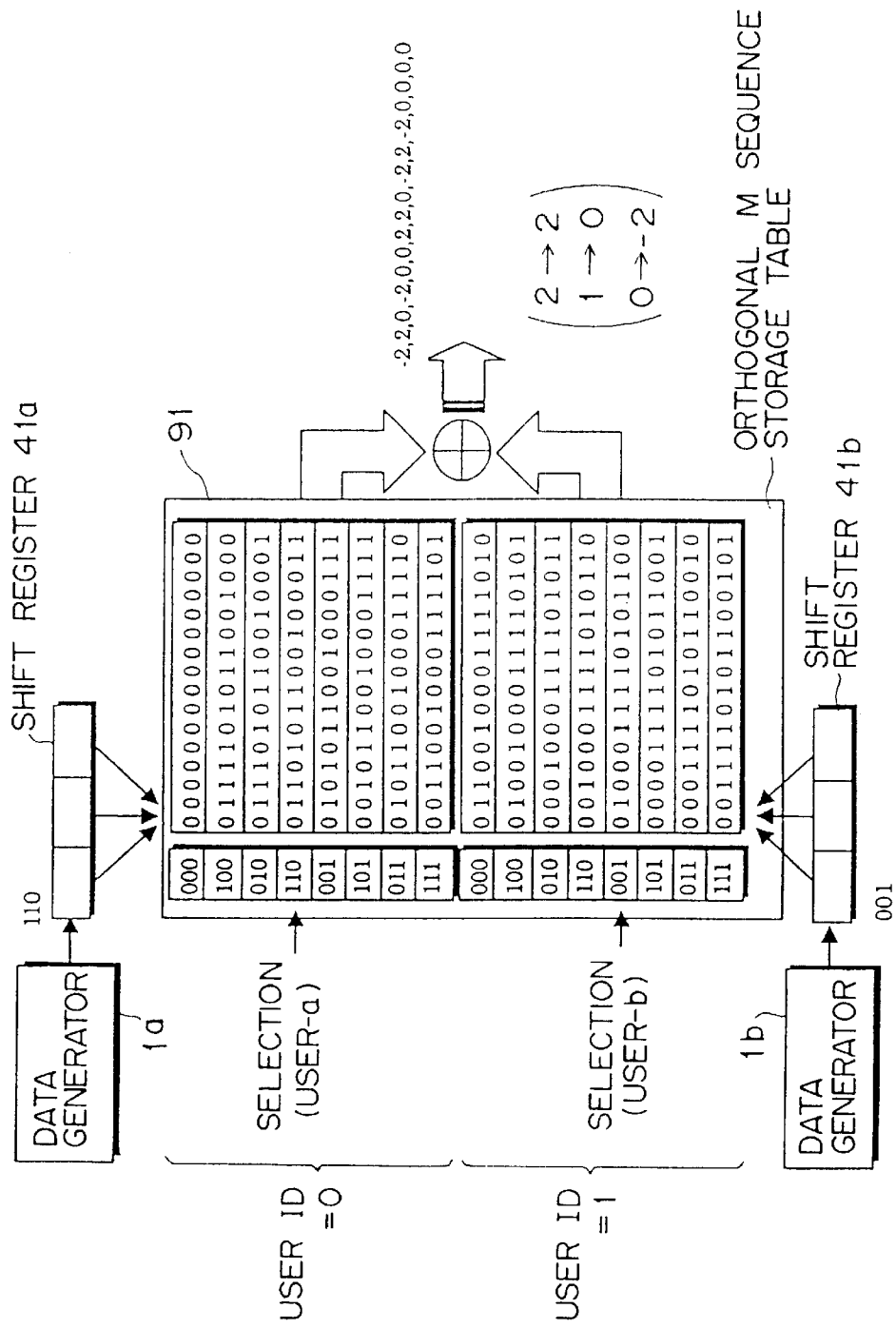
FIG. 12 is a configuration diagram of the 6th embodiment.

FIG. 12 is a configuration diagram of the 6th embodiment of this invention. Here, we will show the example of spreading of data that is sent to user-a and user-b.

The data generators 1a and 1b generate data to be sent to user a and user-b, respectively. The shift registers 41a and 41b store the data to be sent that have been generated by the data generators 1a and 1b, respectively, sequentially. Here, both the shift registers 41a and 41b have 3 stages. The number of destinations to which data can be sent simultaneously is 2. Consequently, the user ID consists of 1 bit. Although it is not shown in the figure, the 6th embodiment also has a register to store the user IDs.

The orthogonal M sequence storage table 91 stores the previously generated orthogonal M sequences for each user ID. Each orthogonal M sequence is stored with the data to be sent that are stored in the shift register 41a or 41b, and the user ID, as keys. Since the shift registers 41a and 41b each have 3 stages, and the user ID consists of 1 bit, the length of each orthogonal M sequence is 16. The number of orthogonal M sequences for each user ID is $2^3=8$.

In this embodiment, the data are to be sent to 2 destinations at once, so the spread code data that are generated for each destination are added to each other by an adder. The adder that is used here is not one that finds logical sums, and also is not one that finds exclusive logical sums, but is one that simply adds values of corresponding bits. The values "2", "1" and "0" that are obtained as summation values are converted into 3-level data consisting of "+2", "0" and "−2", respectively. This transformation is performed for the purpose of data modulation. Since this method of modulation is already-known technology, a detailed explanation of it is omitted here.

When the spread code data are encoded, it is necessary to use an orthogonal M sequence that is the same as the orthogonal M sequence that was generated on the sending side. That is to say, in the example shown in FIG. 12, if the orthogonal M sequence in the 4th row from the top of the table used for user-a or the orthogonal M sequence in the 5th row from the top of the table used for user-b is used, then the spread code data can be correctly encoded. Consequently, if, for example, in user-a's terminal, the orthogonal M sequence in the 5th row from the top of the table used for user-b is used, then the data sent to user-b will be encoded. However, in actual fact, the user ID for user-b is not set in user-a's terminal, so even if the orthogonal M sequence in the 5th row from the top of the table used for user-b is used, the spread data cannot be encoded. This also applies to user-b's terminal. Thus, each user's terminal cannot encode data to be sent to other users' terminals.

Figure 13:
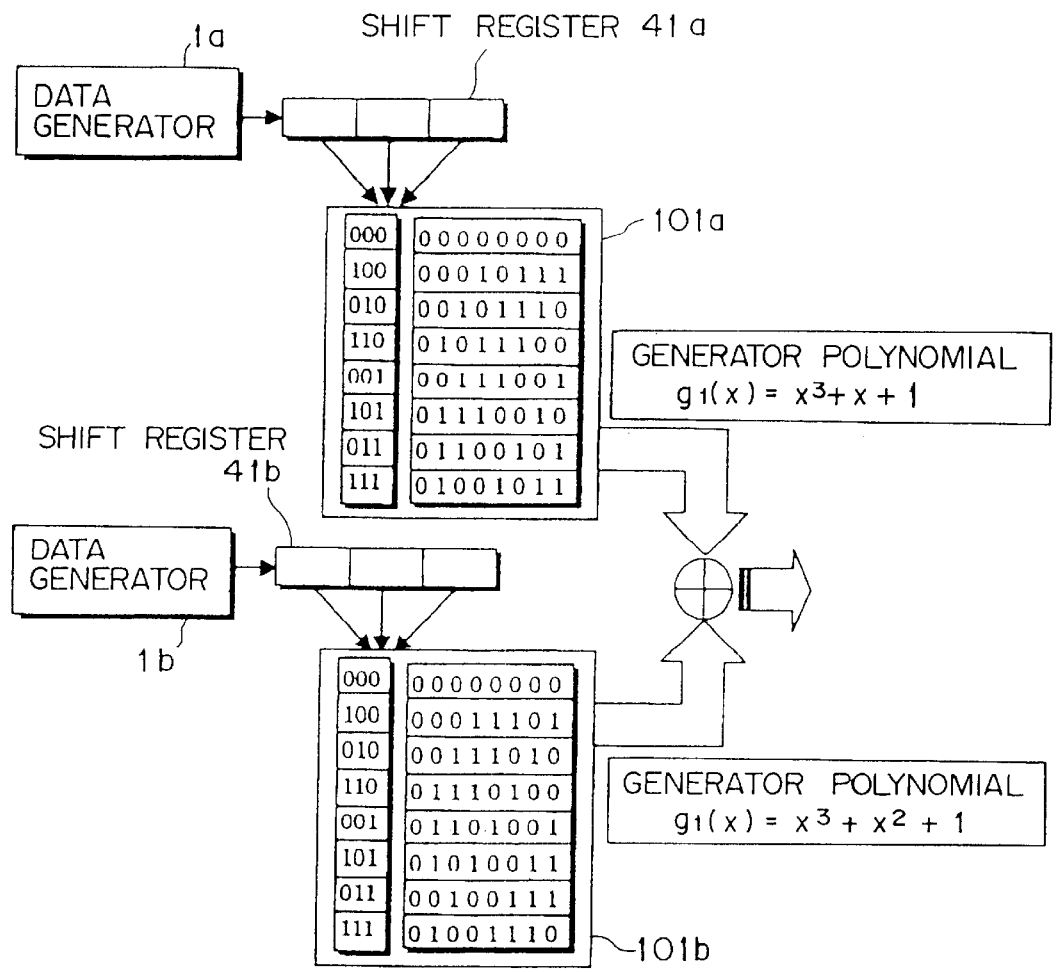
FIG. 13 is a configuration diagram of the 7th embodiment.

FIG. 13 is a configuration diagram of the 7th embodiment of this invention. The 7th embodiment has many points in common with the 6th embodiment shown in FIG. 12. However, in the 7th embodiment, the generator polynomial for the purpose of generating orthogonal M sequences is different for each user (destination).

In general, the M sequences that are obtained from the mutually differing generator polynomials have non-zero cross-correlations. However, combinations of generator polynomials have been found that will give uniformly small cross-correlations. Combinations such as these are called Preferred Pairs. In the 7th embodiment, generator polynomials that are known to form Preferred Pairs are used.

The shift registers 41a and 41b are both 3-stage shift registers. Consequently, generator polynomials of period $2^3-1$ are used. Here, "g1 (x)=$x^3+x+1$" and "g2(x)=$x^3+x^2+1$" are used. The orthogonal M sequences that are obtained from the generator polynomials g1(x) and g2(x) are stored in the orthogonal M sequence storage tables 101a and 101b, respectively. The action by which an orthogonal M sequence is generated from the data to be sent is as described above.

Figure 14:
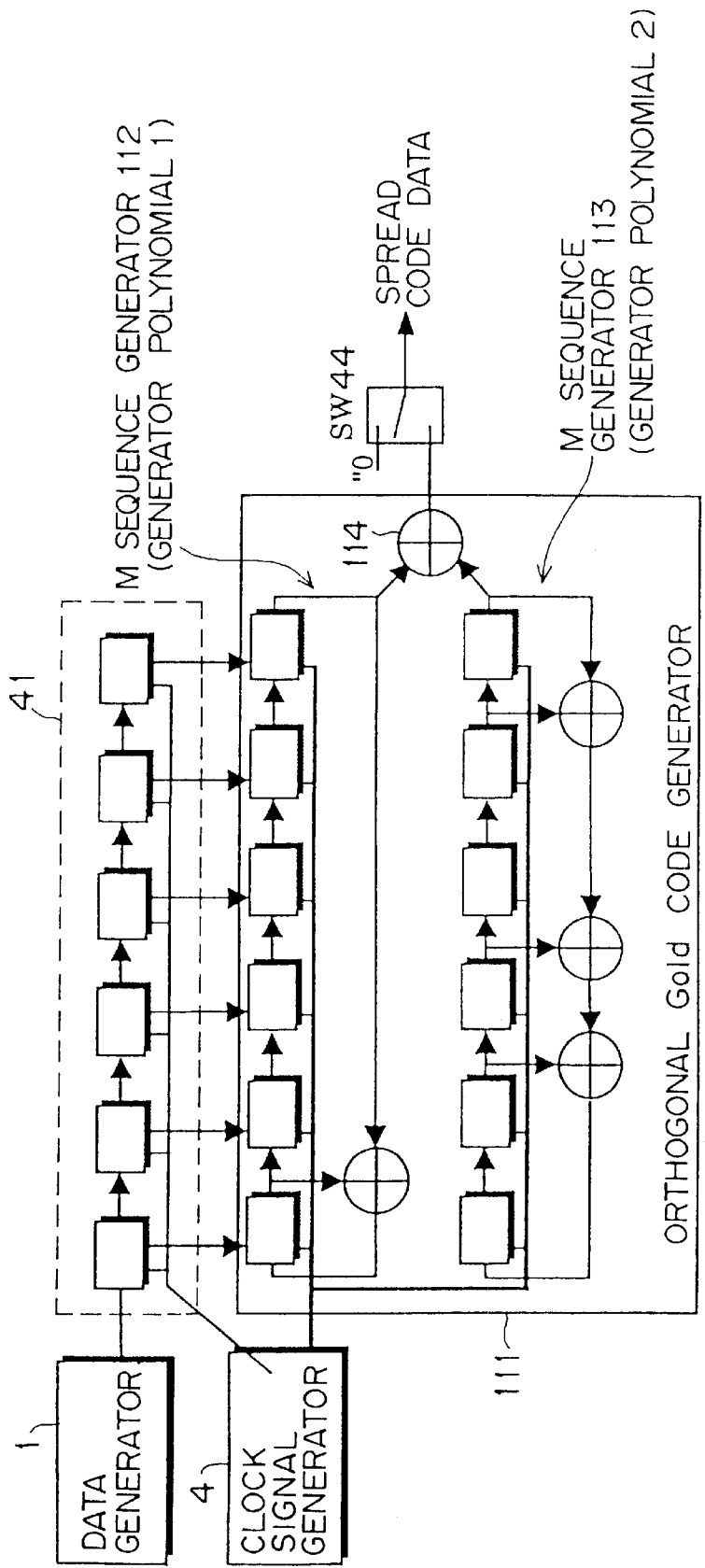
FIG. 14 is a configuration diagram of the 8th embodiment.

FIG. 14 is a configuration diagram of the 8th embodiment of this invention. In the 8th embodiment, the orthogonal Gold code is used. The orthogonal Gold code is a code that is generated using the M sequences of a Preferred Pair. A methods of generating orthogonal Gold codes using 2 shift registers, and a method using 1 shift register, are widely known. In this embodiment, the former method is adopted.

The orthogonal Gold code generator 111 has the M sequence generators 112 and 113, which form a pair. The M sequence generators 112 and 113 correspond to the generator polynomial 1 and the generator polynomial 2, respectively. Note that the generator polynomial 1 and the generator polynomial 2 form a Preferred Pair. The shift registers of the M sequence generators 112 and 113 act in accordance with a clock signal of frequency $2^m$ times the data rate of the data to be sent (the shift clock frequency of the shift register 41). Here, m is the number of stages of the shift register 41. The M sequences, that are generated by the M sequence generators 112 and 113, respectively, are added by the adder 114, and the sum is then output.

We will now explain the action of the 8th embodiment. Every time a new bit of data to be sent is input, the shift register 41 loads the data to be sent that are stored in the shift register 41 at that time into the shift register of the M sequence generator 112. At this time, the switch 44 selects "0", which is output. Further, it is assumed that at this time predetermined values are written into the shift register of the M sequence generator 113. Any arbitrary pattern other than all 0s can be used as the value that is set in the shift register of the M sequence generator 113.

Subsequently, the M sequence generator 112 generates an M sequence with the data to be sent that were loaded from the shift register 41 as an initial value. Meanwhile, the M sequence generator 113 generates an M sequence with the predetermined set value as the initial value. The M sequences that are generated by the M sequence generators 112 and 113 are added by the adder 114, and the sum is output.

Immediately after the M sequence generator 113 outputs an M sequence, the M sequence generator 113 returns to its previous state (the state in which the set value described above is stored). This is as has previously been explained. Consequently, even in the case in which the next data to be sent are input to the shift register 41, the M sequence generator 113 again generates the same M sequence.

It is also possible to introduce the concept of the 2nd embodiment into the spread encoding device of the 8th embodiment, and use a single shift register as both the shift register 41 and a shift register in the M sequence generator 112. Further, the concept of the 3rd embodiment can also be introduced into the spread encoding device of the 8th embodiment. That is to say, the respective M sequences obtained from the two generator polynomials can be stored in a table, and as necessary M sequences are extracted from the table and used to generate orthogonal Gold codes.

Figure 15:
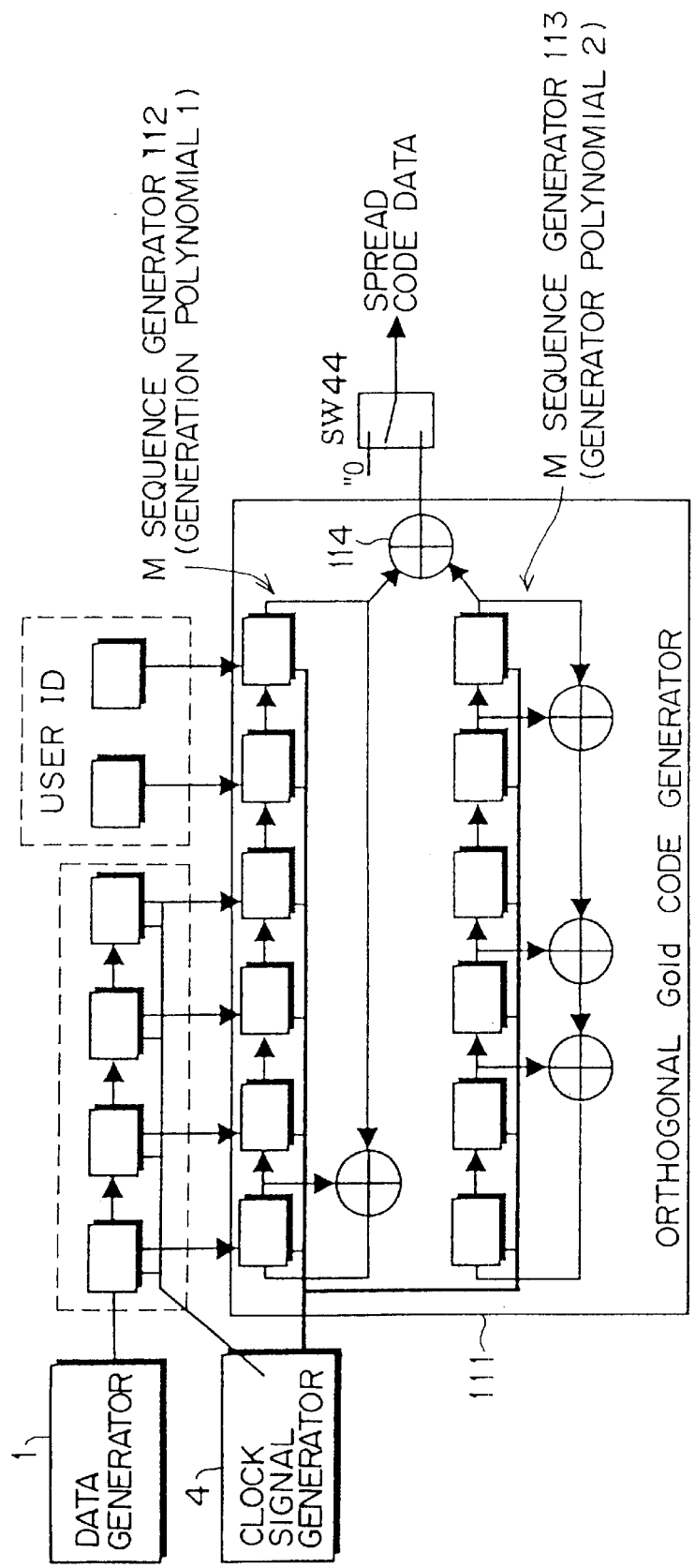
FIG. 15 is a configuration diagram showing a variant of the 8th embodiment.

In addition, the concepts of the 4th and 5th embodiments can be introduced into the spread encoding device of the 8th embodiment. In this case, as shown in FIG. 15, the configuration is such that the data to be sent and the user ID are loaded into the M sequence generator 112. Alternatively, the configuration can be as shown in FIG. 14, with the user ID used as the initial value for the M sequence generator 113.

When an orthogonal M sequence is used as spread code data, there are cases in which it is difficult to establish synchronization on the receiving side. This is because the orthogonal M sequence is generated by bit shifting. In the 9th embodiment of this invention, to be presented next, we explain a configuration in which an orthogonal Gold code is used to establish reliable synchronization on the receiving side.

In the 9th embodiment of this invention, the spread encoding device shown in FIG. 14 is used. In the spread encoding device shown in FIG. 14, if it is assumed that known data are loaded into the shift register of the M sequence generator 112, then predetermined values are set in the M sequence generator 113, so it is possible to know the M sequences generated by the M sequence generators 112 and 113, with the result that it is also possible to know the orthogonal Gold code that is generated by the orthogonal Gold code generator 111. For example, if "all 0s (0, 0, . . . , 0, 0)" are loaded into the shift register of the M sequence generator 112, then the output of the M sequence generator 112 is also "all 0s". In this case, the orthogonal Gold code generator 111 outputs the M sequence generated by the M sequence generator 113 as it is. In other words, if the data to be sent are "all 0s", then the M sequence that is generated by the M sequence generator 113 is what is transmitted to the receiving side.

Figure 16A:
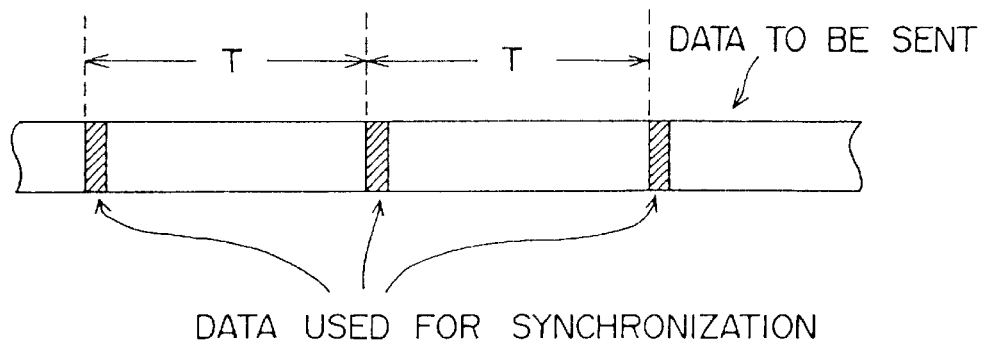
FIG. 16A is a diagram showing data to be sent into which data used for synchronization have been inserted.

In this embodiment, as shown in FIG. 16A, known values (data used for synchronization) are inserted in between the actual data to be sent at specified intervals T. The number of bits in these data used for synchronization is the same as the number of stages in the shift register 41. If a specified pattern (for example, "all 0s") is used as the data used for synchronization, then the number of bits in the data used for synchronization can be made larger than the number of stages in the shift register 41. However, in this case there is a danger that the synchronization point will become diffused. Consequently, it is desirable that the number of bits in the data used for synchronization be the same as the number of stages in the shift register.

If synchronization data are inserted among the actual data to be sent as described above, then the spread encoding device shown in FIG. 14 sends known spread code data at specified intervals T. These known spread code data are an orthogonal Gold code generated from the M sequence obtained from the generator polynomial 1 using the synchronization data as an initial value and from the M sequence obtained from the generator polynomial 2 in accordance with predetermined initial value.

Figure 17:
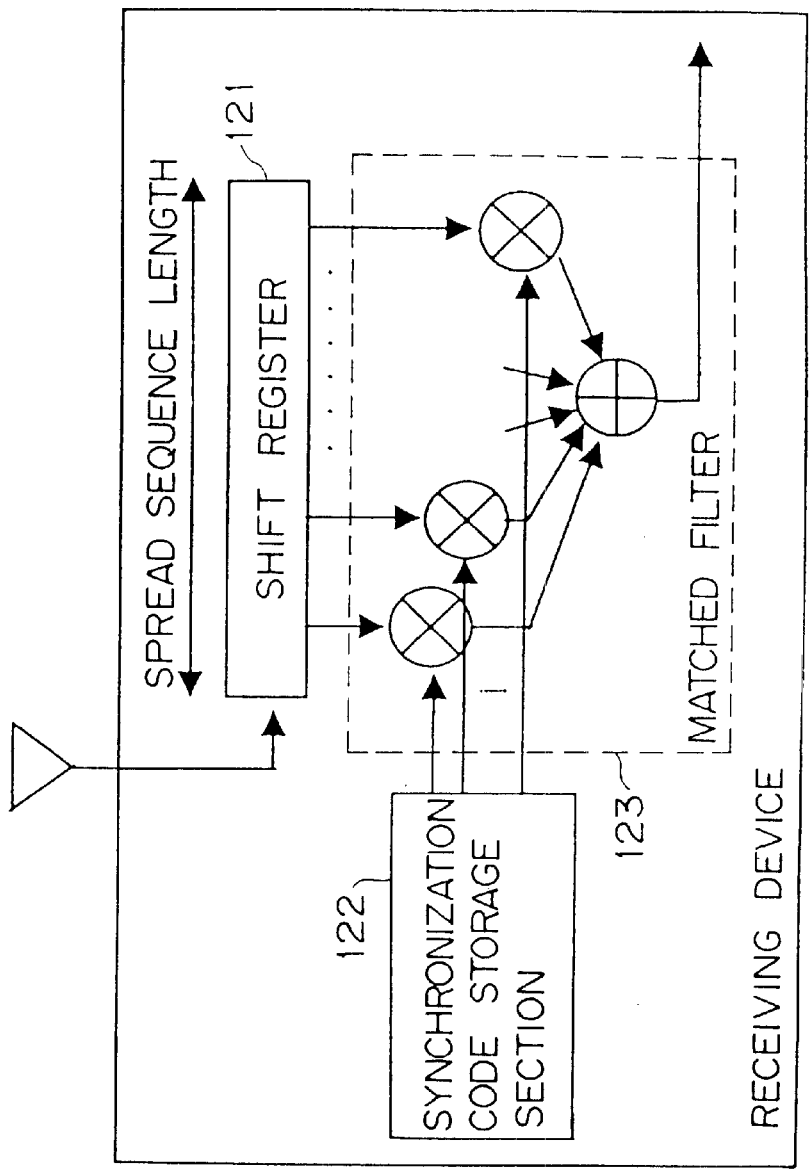
FIG. 17 is a configuration diagram showing the important parts of the device that receives the spread code data in the 9th embodiment.

FIG. 17 is a configuration diagram of the important parts of the device that receives spread code data in the 9th embodiment. FIG. 17 shows only the configuration that is related to detection of the synchronization point from the received spread code data.

The shift register 121 stores the received spread code data while shifting them 1 bit at a time. The number of stages in the shift register 121 is the same as the spread sequence length (the number of bits in the spread sequence). The synchronization code storage section 122 stores the known spread code data described above (the orthogonal Gold code generated from the M sequence obtained from the generator polynomial 1 with the synchronization data as an initial value and the M sequence obtained from the generator polynomial 2 in accordance with predetermined an initial value). The matched filter 123 compares the spread code data stored in the shift register 121 with the spread code data stored in the synchronization code storage section 122. The matched filter 123 outputs an analogue value or a digital value corresponding to the correlation level between the 2 spread code data.

Figure 16B:
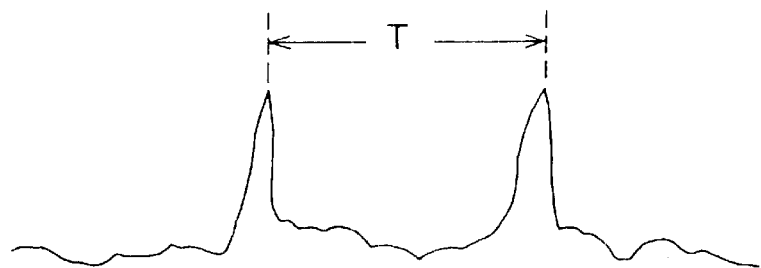
FIG. 16B is a diagram showing the output of the matched filter.

In the configuration described above, the output of the matched filter 123 becomes a maximum at the timing at which the data stored in the shift register 121 are the spread code data corresponding to the above-mentioned synchronization data. Consequently, as shown in FIG. 16B, peaks appear in the output of the matched filter 123 at the specified intervals T. The timing at which the output of this matched filter 123 reaches a peak is the synchronization point. In the 9th embodiment, in the device on the receiving side, synchronization is established based on this synchronization point.

Figure 18:
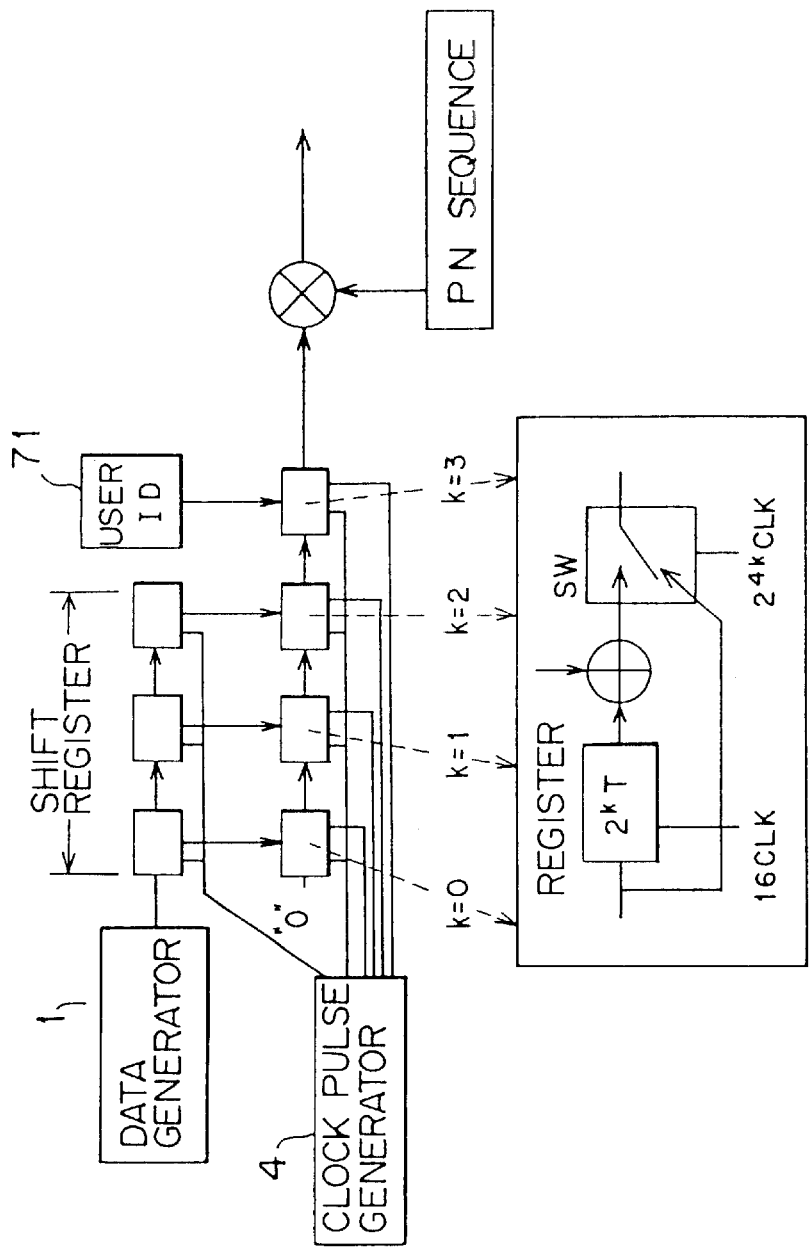
FIG. 18 is a configuration diagram of the 10th embodiment.

FIG. 18 is a configuration diagram of the 10th embodiment of this invention. The 10th embodiment is basically the existing LROCC method disclosed in reference 1 and reference 2 (the method that uses Walsh sequences) modified so that it can be used in a multi-user system.

The device of the 10th embodiment has a configuration in which the user ID register 71 is added to the previously existing circuitry. The m bits of data to be sent that are stored in the shift register and the n-bit user ID that is stored in the user ID register are loaded into the register used by the generator polynomial. Then a Walsh sequence is generated based on these data that have been loaded, and, in addition, the generated Walsh sequence is multiplied by a PN sequence, and the product is transmitted.

Figure 19:
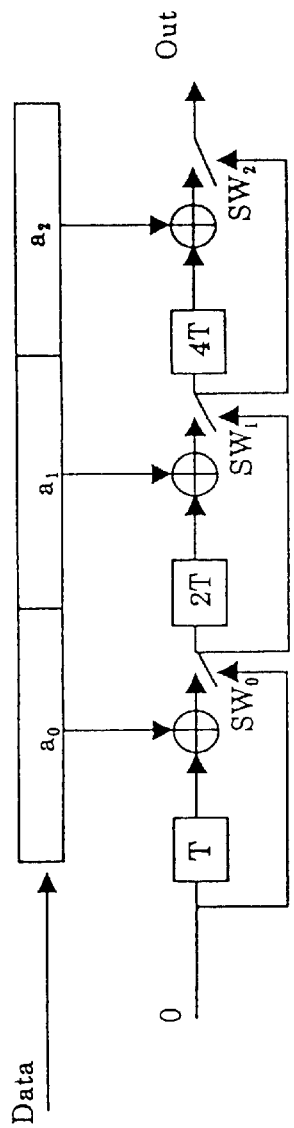
FIG. 19 is a diagram explaining the existing LROCC method.

The method of generating a Walsh sequence is known technology, and is described in reference 1 and reference 2, so here it is merely illustrated in FIG. 19. Note that in FIG. 19, "T", "2T" and "4T" indicate that 1, 2 and 4 registers are provided, respectively. The states of the switches are indicated as "L" or "H"; these indicate whether, in the figure, the lower side output is connected or the upper side output is connected. This device outputs all of the patterns obtained from the data stored in the shift register. The Hadamard matrix that is used when generating the Walsh sequence is well-known to people skilled in the art.

In the 10th embodiment of this invention, a different sequence is generated for each user ID, so that even using the existing LROCC system, a plurality of users can send and receive data simultaneously.

Next, we will simply explain the methods by which data are sent using the spread encoding device of this invention, and then those data are reproduced in the receiving unit. FIG. 20A shows the correspondence relationship between the data stored in the shift register 41 and the orthogonal M sequence generated using those data as an initial value in the spread encoding device of the 1st embodiment shown in FIG. 6.

In the spread encoding device, the an initial value in the shift register 41 are taken to be "0, 0, 0, 0" and the data to be sent "1" "1" "0", . . . are input into the shift register 41 sequentially. In this case, the spread encoding device sends the data in the top row of the spread code data shown in FIG. 20B.

In a wireless communication system, in general bit errors occur in the transmission path. Examples of bit errors appear as "noise" as shown in the middle row of FIG. 20B. When a bit error occurs in the transmission path, the data received in the receiving unit differ from the data that were actually sent (see the bottom row of FIG. 20B).

Figure 21:
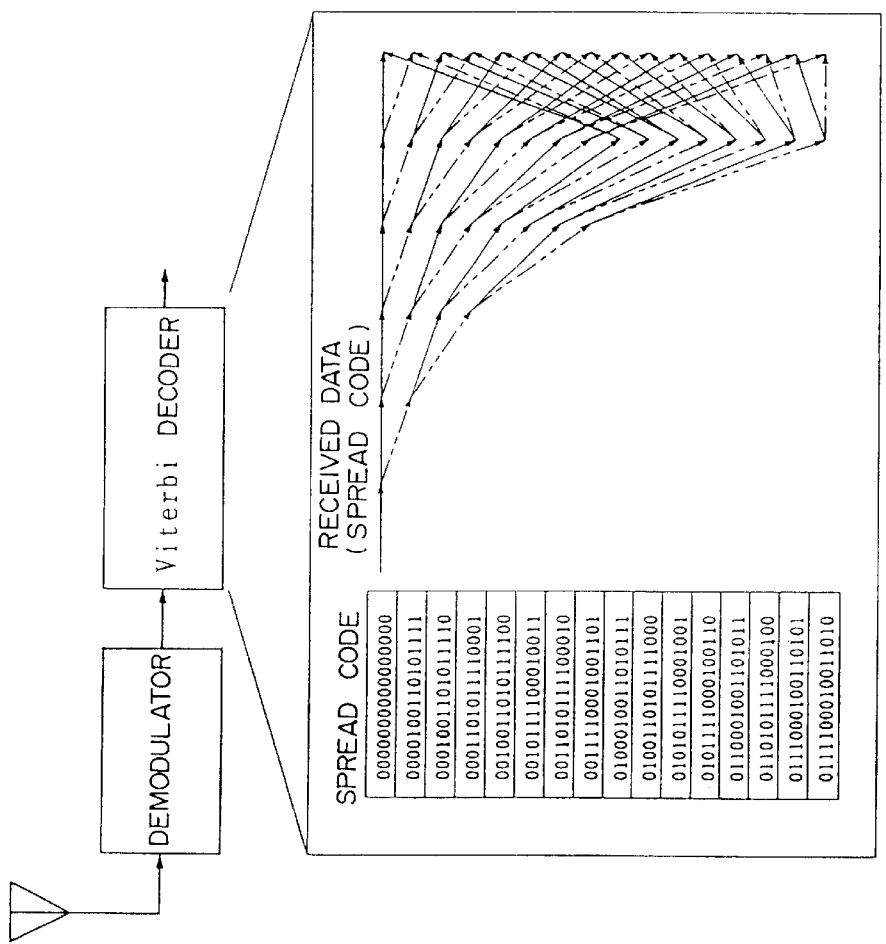
FIG. 21 is a diagram showing one example of a device that receives data encoded using the spread encoding device of this invention.

The convolutional code used in this invention is used in order to make it possible to correct errors of this type in the unit on the receiving side. An example of a device that receives data encoded using the spread encoding device of this invention is shown in FIG. 21.

The spread encoding device of this invention executes convolutional encoding at the same time as spreading modulation of the data to be sent, so the receiving device executes Viterbi decoding for the data that have been demodulated by the demodulator (data in the spread state). The Viterbi decoder has a function that generates the same sequence as the orthogonal M sequence generated in the spread encoding device on the sending side. Then the metric (corresponding to the path metric in ordinary convolutional code) of the demodulated data and the spread code generated by that function is found, and the actual data are encoded based on this metric.

Viterbi encoding is a known technology, so a detailed description of it is omitted here. In addition, the configuration of the demodulator is determined by the modulation method, so it is not defined here.

Figure 22:
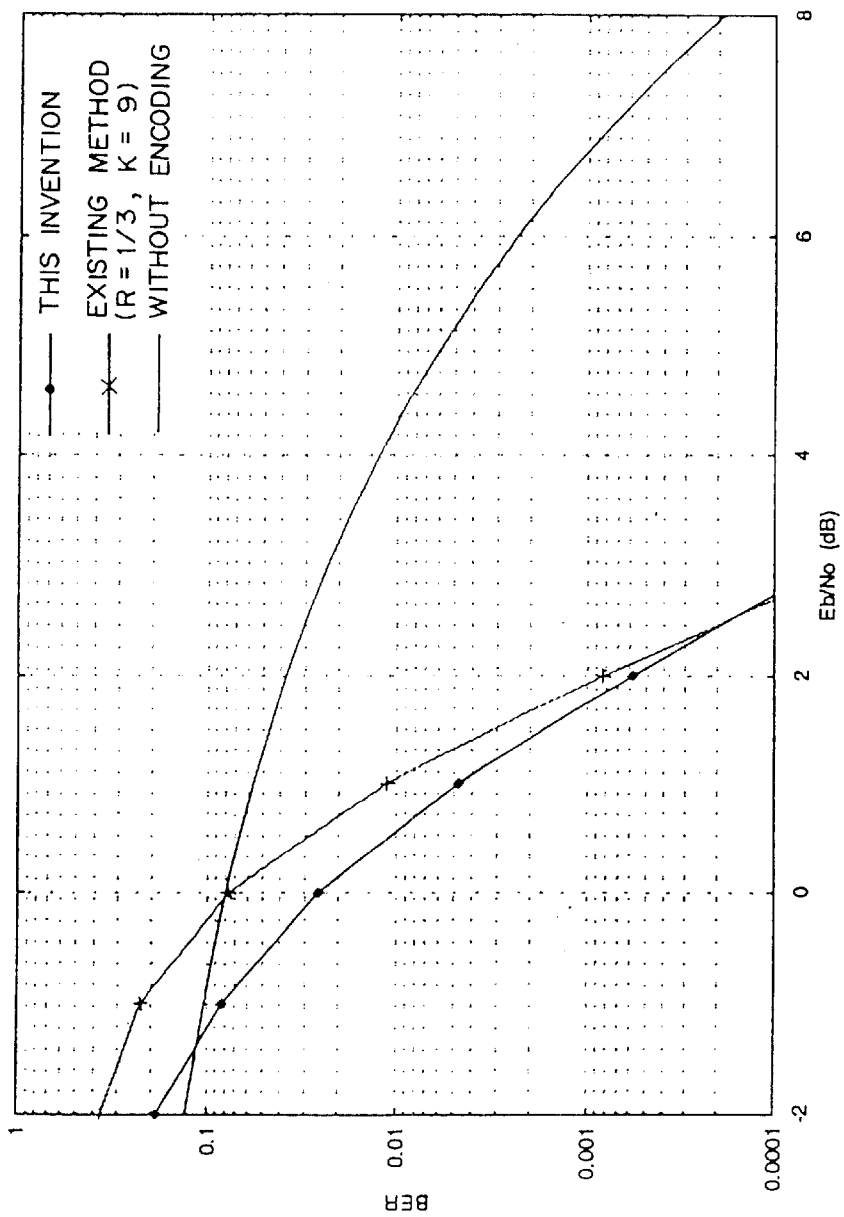
FIG. 22 is a graph showing the result of a simulation of BER values.

FIG. 22 shows the result of a simulation of BER values. Here, the case in which this invention is implemented, the case in which encoding processing is not executed, and the case in which existing convolutional code is implemented, are compared. Note that the spread encoding device of this invention calculates the spread sequence length as 512 (that is to say, the shift register is assumed to have 9 stages). Existing convolutional codes calculate the constraint length as 9.

As shown in FIG. 22, the BER values in the case in which the spread encoding device of this invention is used are improved compared to the values when a previously existing method is used.

In the embodiments described above, the shift register that receives the data to be sent has a configuration that shifts the data 1 bit at a time, but the invention is not necessarily limited to this configuration. That is to say, this invention can be applied to systematic convolutional code with the data to be sent being input to the shift register a plurality of bits at a time.

The "shift register" can be formed either as a hardware configuration or as a software configuration.

When this invention is used, the same circuit can be used both as the circuit that executes convolutional encoding processing on the data to be sent, and the circuit that spreads the spectrum of those data to be sent, so the scale of the circuitry is made smaller.

By using an orthogonal M sequence or an orthogonal Gold code as the spread sequence, the spectrum of the data that are sent can be adequately spread, so the peak of the output spectrum can be suppressed.

Further, in a configuration that uses an orthogonal M sequence or an orthogonal Gold code, it is easy to increase the speed beyond that which is obtained with a configuration that uses an existing type of Walsh sequence, so the spread sequence length can be made longer. Consequently, part of the spread sequence can be assigned to the purpose of identifying the user, making it possible to apply this method in a multi-user system.

What is claimed is:

1. A spread encoding device that spreads data to be sent, comprising:

a shift register to store m bits of data to be sent;

spreading means for generating an M sequence having a period of $2^m-1$ using the m bits of data to be sent that are stored in said shift register as an initial value, for generating an orthogonal M sequence from that M sequence, and for outputting the orthogonal M sequence as the spread sequence of the data to be sent; and, clock generating means for generating a clock signal of frequency $2^m$ times the data rate of the data to be sent, wherein said spreading means generates the M sequence in accordance with the clock signal generated by said clock generating means.

2. A spread encoding device that spreads data to be sent, comprising:

a shift register to store m bits of data to be sent; and spreading means for generating an M sequence having a period of $2^m-1$ using the m bits of data to be sent that are stored in said shift register as an initial value, for generating an orthogonal M sequence from that M sequence, and for outputting the orthogonal M sequence as the spread sequence of the data to be sent; wherein said spreading means generates the orthogonal M sequence by adding a bit of 0 to the M sequence.

3. A spread encoding device that spreads data to be sent, comprising:

an m-bit shift register that stores the data to be sent;

computing means for computing a feedback calculation a specified number of times, in accordance with a generator polynomial that is for the purpose of generating an M sequence of period $2^m-1$, with the data to be sent that are stored in said shift register as an initial value; and spreading means for generating an orthogonal M sequence from the M sequence obtained by said computing means, and for outputting the orthogonal M sequence as the spread sequence of the data to be sent.

4. A spread encoding device that spreads data to be sent, comprising:

an m-bit shift register that stores the data to be sent;

a table storing orthogonal M sequences which correspond respectively to all of the patterns that can be obtained from m bits of data, and which have a spread code length of $2^m$; and spreading means for extracting an orthogonal M sequence corresponding to the m bits of data to be sent that are stored in said shift register from said table, and for outputting the extracted orthogonal M sequence as the spread code for the data to be sent.

5. A spread encoding device that spreads data to be sent, comprising:

an m-bit shift register that stores the data to be sent;

storing means for storing a channel identifier that identifies a communication channel to which the data to be sent are assigned; and spreading means for generating an M sequence of period $2^{(m+n)}-1$ with the m+n bits of data consisting of the m bits of data to be sent that are stored in said shift register and the n bit channel identifier that is stored in said storing means as an initial value, for generating an orthogonal M sequence from that M sequence, and for outputting the orthogonal M sequence as the spread sequence of the data to be sent.

6. A spread encoding device that spreads data to be sent, comprising:

an m-bit shift register that stores the data to be sent;

storing means for storing a channel identifier that identifies a communication channel to which the data to be sent are assigned;

connecting means for connecting said shift register and said storing means to form a generator polynomial register;

computing means for computing a feedback calculation a specified number of times, in accordance with a generator polynomial that is for the purpose of generating an M sequence of period $2^{(m+n)}-1$, with the m+n bits of data stored in the generator polynomial register formed by said connecting means, the m+n bits of data consisting of the m bits of data to be sent and the n bit channel identifier, as an initial value; and spreading means for generating an orthogonal M sequence from the M sequence obtained by said computing means, and for outputting the orthogonal M sequence as the spread sequence of the data to be sent.

7. A spread encoding device that spreads data to be sent, comprising:

an m-bit shift register that stores the data to be sent;

storing means for storing a channel identifier that identifies a communication channel to which the data to be sent are assigned;

a table storing orthogonal M sequences which correspond respectively to all of the patterns that can be obtained from m+n bits of data, and which have a spread code length of $2^{(m+n)}$; and spreading means for extracting an orthogonal M sequence corresponding to a combination of the m bits of data to be sent that are stored in said shift register and the n bit channel identifier that is stored in said storing means from said table, and for outputting the extracted orthogonal M sequence as the spread code for the data to be sent.

8. A spread encoding device that spreads data to be sent, comprising:

an m-bit shift register that stores the data to be sent;

a plurality of M sequence generators that generate M sequences of period $2^{(m+n)}-1$ in accordance with a plurality of mutually different generator polynomials;

selecting means for selecting an M sequence generator from among said plurality of M sequence generators corresponding to a channel identifier that identifies a communication channel to which the data to be sent are assigned; and spreading means for generating an M sequence using the M sequence selected by said selecting means with the m bits of data to be sent stored in said shift register as an initial value, for generating an orthogonal M sequence from that M sequence, and for outputting the orthogonal M sequence as the spread sequence of the data to be sent.

9. The spread encoding device according to claim 8, wherein the plurality of M sequences generated by said plurality of M sequence generators respectively form preferred pairs.

10. A spread encoding device that spreads data to be sent, comprising:

an m-bit shift register that stores data to be sent;

a code generator generating an orthogonal Gold code based on a first generator polynomial and a second generator polynomial, each of which has a period of $2^m-1$; and spreading means for feeding the m bits of data to be sent that are stored in said shift register for the first generator polynomial as an initial value, and for outputting the orthogonal Gold code obtained from said code generator as the spread sequence of the data to be sent.

11. The spread encoding device according to claim 10, further comprising inserting means for inserting m bits of predetermined synchronization pattern data for the data to be sent at specified intervals.

12. A spread encoding device that spreads data to be sent, comprising:

a shift register that stores m bits of data to be sent;

storing means for storing a channel identifier that identifies a communication channel to which the data to be sent are assigned; and spreading means for generating an orthogonal M sequence using the m bits of data stored in said shift register and the channel identifier stored in said storing means as an initial value, and for outputting the generated orthogonal M sequence as the spread code for the data to be sent.

13. A spread spectrum communication system that spreads data and transfers the spread data from a sending device to a receiving device, wherein said sending device comprises:

an m-bit shift register that stores data to be sent into which m bits of predetermined synchronization pattern data have been inserted at specified intervals;

a code generator generating an orthogonal Gold code based on a first generator polynomial and a second generator polynomial, each of which has a period of $2^m-1$; and spreading means for feeding the m bits of data to be sent that are stored in said m-bit shift register for the first generator polynomial as an initial value, and for outputting the orthogonal Gold code obtained from said code generator as the spread sequence of the data to be sent, and wherein said receiving device comprises:

A $2^m$-bit shift register that stores the spread sequences from said sending device sequentially;

code storing means for storing a code that might have been generated by said sending device when the synchronization pattern data were fed to the first generator polynomial;

comparing means for comparing the spread sequence stored in said $2^m$-bit shift register with the code stored in said code storing means; and detecting means for detecting a synchronization timing based on the result obtained by said comparing means.

14. A spread encoding method that spreads data to be sent, comprising the steps of:

storing the data to be sent in an m-bit shift register;

storing an n-bit channel identifier that identifies a communication channel to which the data to be sent are assigned;

generating an M sequence of period $2^{(m+n)}-1$ using the m bits of data stored in the shift register and the stored channel identifier as an initial value, and generating an orthogonal M sequence from that M sequence and outputting the orthogonal M sequence as spread sequence of the data to be sent.

* * * * *